(12) United States Patent
Barrows et al.

(10) Patent No.: US 7,659,967 B2
(45) Date of Patent: Feb. 9, 2010

(54) TRANSLATIONAL OPTICAL FLOW SENSOR

(76) Inventors: Geoffrey Louis Barrows, 1831 Biltmore St. NW., Apt. B, Washington, DC (US) 20009; Craig William Neely, 2802 Evelyn Ct., Vienna, VA (US) 22180-7015

( * ) Notice: Subject to any disclaimer, the term of this patent is extended or adjusted under 35 U.S.C. 154(b) by 451 days.

(21) Appl. No.: 11/681,938

(22) Filed: Mar. 5, 2007

(65) Prior Publication Data
US 2009/0225300 A1 Sep. 10, 2009

(51) Int. Cl.
*G01P 3/36* (2006.01)
*G01P 21/00* (2006.01)
(52) U.S. Cl. .................. 356/28.5; 356/28; 73/1.41
(58) Field of Classification Search ............ 356/28, 356/28.5; 73/1.41; 702/142
See application file for complete search history.

(56) References Cited

U.S. PATENT DOCUMENTS

| 5,257,209 | A | | 10/1993 | Markandey | |
|---|---|---|---|---|---|
| 5,598,488 | A | * | 1/1997 | Poggio et al. | 382/278 |
| 6,020,953 | A | | 2/2000 | Barrows | |
| 6,194,695 | B1 | | 2/2001 | Barrows | |
| 6,384,905 | B1 | * | 5/2002 | Barrows | 356/28 |
| 6,493,068 | B1 | | 12/2002 | Barrows | |
| 6,683,678 | B2 | | 1/2004 | Barrows | |
| 7,522,091 | B2 | * | 4/2009 | Cong et al. | 342/70 |

OTHER PUBLICATIONS

James Gibson, The Ecological Approach to Visual Perception (book), 1950, Houghton Mifflin, Boston.
Carver Mead, Analog VLSI and Neural Systems (book), 1989, Addison Wesley.
Kurt Miller and Geoffrey Barrows, Feature Tracking Linear Optic Flow Sensor Chip, 1999 International Symposium on Circuits and Systems (ISCAS'99), May 1999, IEEE.
Geoffrey Barrows, Kurt Miller, and Brian Krantz, Fusing Neuromorphic Motion Detector Outputs for Rubust Optical Flow Measurement, 1999 International Joint Conference on Neural Networks (IJCNN'99), Jul. 1999, IEEE.
Geoffrey Barrows, Mixed-Mode VLSI Optical Flow Sensors for Micro Air Vehicles (Ph.D. dissertation), Dec. 1999, University of Maryland at College Park.
Geoffrey Barrows and Craig Neely, Mixed-Mode VLSI Optical Flow Sensors for In-Flight Control of a Micro Air Vehicle, Jul. 2000, SPIE vol. 4109: Critical Technologies for the Future of Computing.
Jean-Christophe Zufferey and Dario Floreano, Toward 30-Gram Autonomous Indoor Aircraft Vision Based Obstacle Avoidance and Altitude Control, 2005 IEEE International Conference on Robotics and Automation (ICRA'05), IEEE.

* cited by examiner

*Primary Examiner*—Isam Alsomiri

(57) ABSTRACT

An optical flow sensor is presented that directly measures the translational component of the optical flow experienced by the sensor while it is on a moving platform. The translational optical flow is measured by using a gyro to measure the platform's angular rates and then incorporating these angular rates in the optical flow computations in a manner that bypasses lags in the optical flow sensor measurement. In one embodiment, individual "velocity report" optical flow measurements have their rotational component removed before these velocity reports are utilized in the remainder of the optical flow algorithm. In another embodiment, a movable window and shifting techniques are used to form a windowed image that has no rotational optical flow components. In another embodiment, an optical flow sensor is mounted on a gimbal and held to point in one direction even as the platform on which the optical flow sensor is mounted moves.

10 Claims, 11 Drawing Sheets

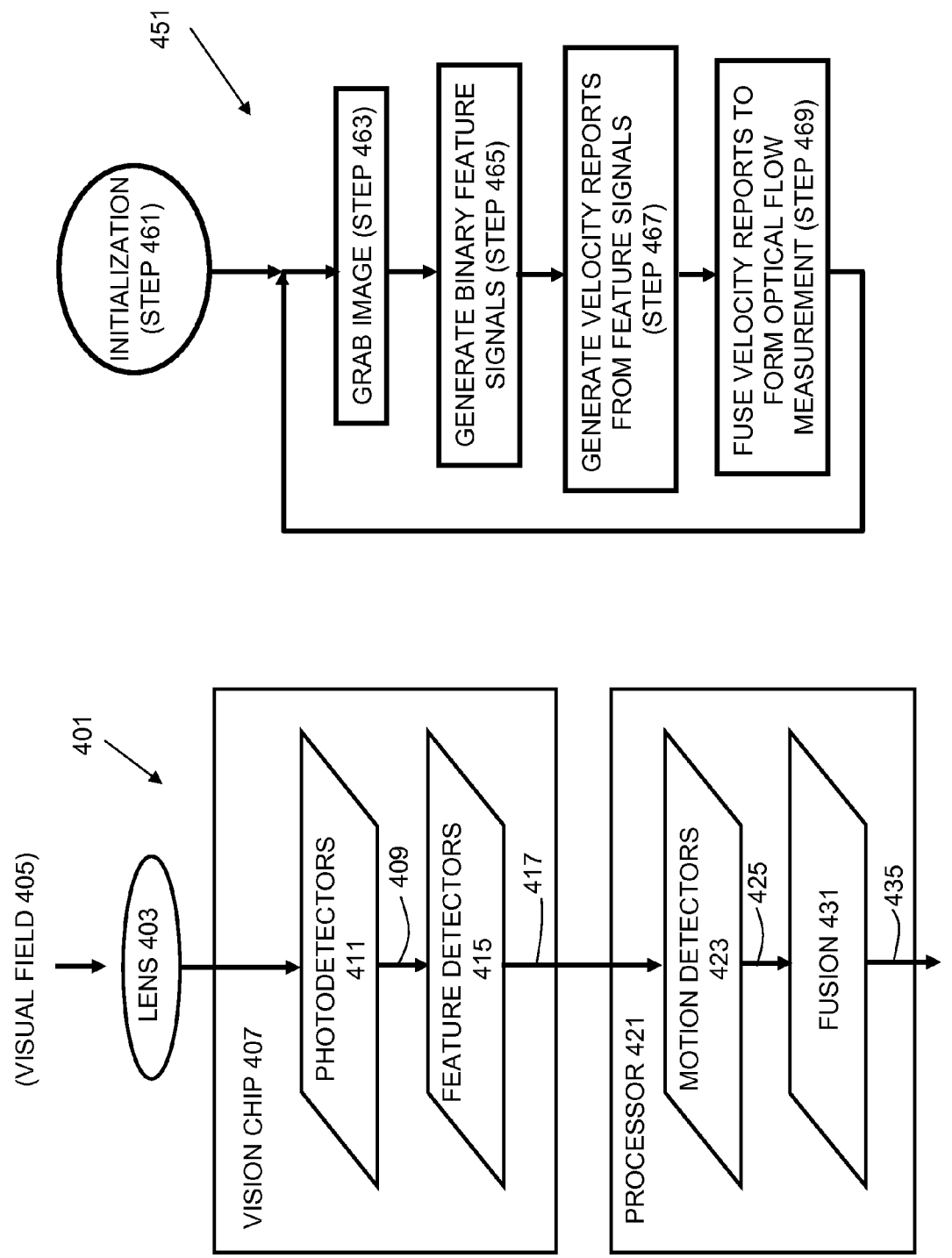

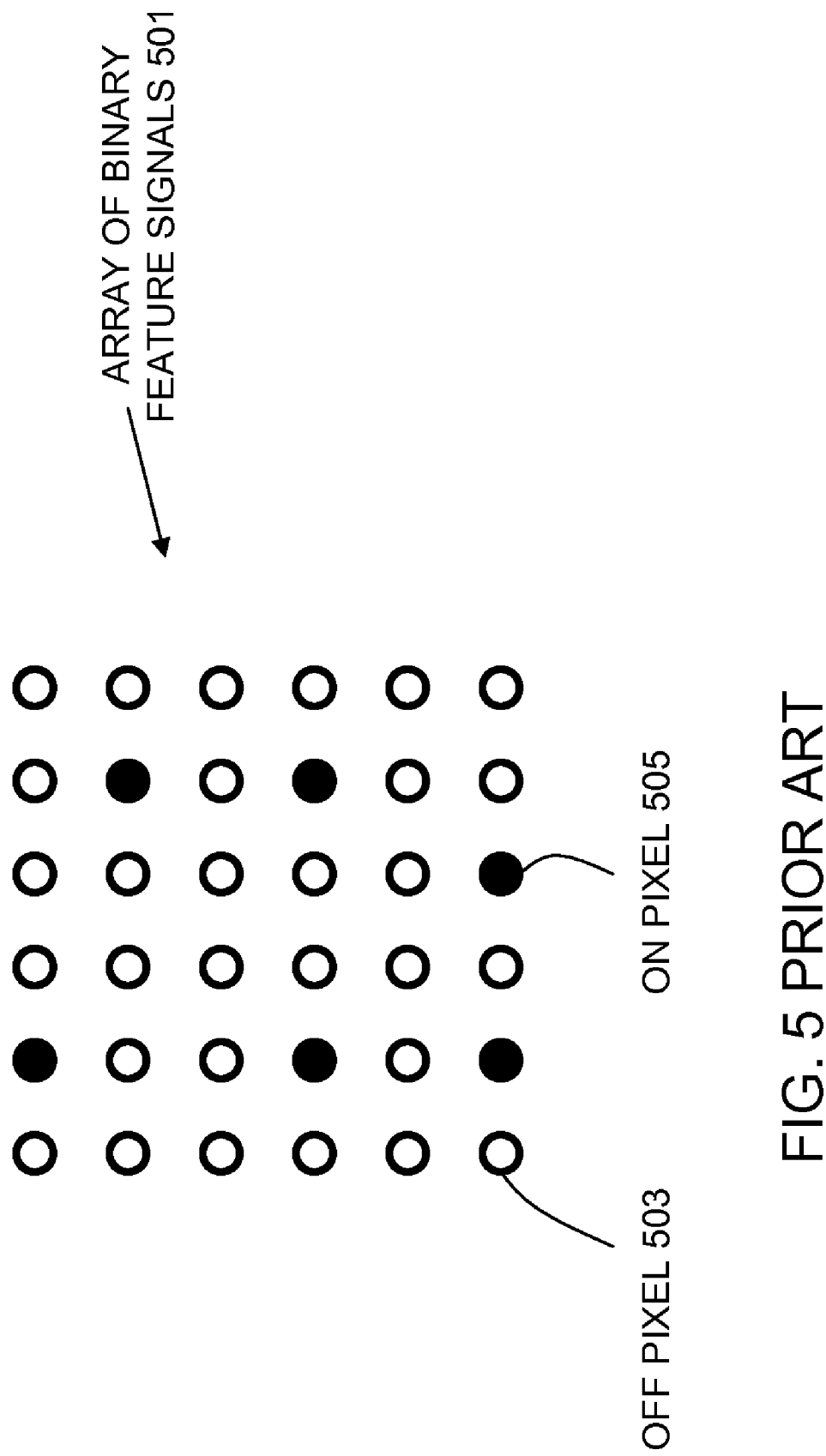

TRANSLATIONAL OPTICAL FLOW SENSOR

FEDERALLY SPONSORED RESEARCH

This invention was made with Government support under Contract No. W31P4Q05CR102 awarded by the United States Army. The Government has certain rights in this invention.

CROSS-REFERENCE TO RELATED APPLICATIONS

Not applicable.

FIELD OF THE INVENTION

This invention relates to electronic sensors and integrated circuits for sensing visual motion or optical flow, in particular for those visual motion or optical flow sensors used on unmanned air vehicles (UAVs), mobile robots, or other moving platforms.

BACKGROUND OF THE INVENTION

A contemporary topic of interest is that of so-called "Unmanned Air Vehicles" (UAVs), or "drone aircraft", especially the smaller "Micro Air Vehicle" variety with wingspans on the order of 10 cm to 100 cm. A significant challenge facing such UAVs is providing them with the ability to operate in near-Earth environments with various levels of autonomy. One method of providing such relative depth information is with the use of optical flow. Optical flow is the apparent visual motion seen from an imager or eye that results from relative motion between the imager and other objects or hazards in the environment. Refer to the book *The Ecological Approach to Visual Perception* by John Gibson for an introduction to optical flow. Consider a UAV flying forward above the ground. The optical flow in the downward direction is faster when the ground is closer, thus optical flow can provide information on the terrain shape below. Optical flow in the forward direction indicates the presence of obstacles from which the UAV must turn. Finally, the same optical flow sensing can provide information on rotation and translation, allowing it to detect and respond to turbulence.

Further examples on how optical flow can be used for obstacle avoidance are discussed in the paper "Biologically inspired visual sensing and flight control" by Barrows, Chahl, and Srinivasan and the Ph.D. dissertation "Mixed-Mode VLSI Optical Flow Sensors for Micro Air Vehicles" by Barrows. The application of optical flow to robotics and other fields is a mature art. Many other papers and book sections are available in the open literature on how to use optical flow for various applications.

As set forth in earlier U.S. patents and other publications, techniques exist to fabricate optical flow sensors that are small, compact, and sufficiently light to be used on UAVs. Particularly relevant U.S. patents include U.S. Pat. Nos. 6,020,953 and 6,384,905. Particularly relevant books include *Vision Chips* by Moini and *Analog VLSI and Neural Systems* by Mead. Particularly relevant other publications include "Mixed-mode VLSI optical flow sensors for in-flight control of a micro air vehicle" by Barrows and Neely and the above-referenced Ph.D. dissertation by Barrows. Other relevant prior art is listed in the references section below.

Note that although this document discusses optical flow and optical flow sensors primarily in the context of UAVs, the subject matter and teachings below are applicable to all types of vehicles, robotic systems, or other systems that contain optical flow sensors or use optical flow sensing.

Separating Translational from Rotational Optical Flow

For sake of discussion, and to provide background material for the teachings below, consider the optical flow experienced by a hypothetical UAV traveling in "flat land". Refer to FIG. 1, which shows from the top perspective three UAVs, drawn for simplicity as small triangles, undergoing three different types of motion. The left UAV 121 is undergoing yaw rotation 123 in the right-hand direction and is otherwise staying in one location. As a result, a camera or sensor system on UAV 121 experiences rotational optical flow 125 in the left-hand direction. The middle UAV 141 is traveling in the forward direction 143 and is not undergoing any rotation. The middle UAV 141 experiences purely translational optical flow 145, which radiates out from the forward direction, converges in the backward direction, and has the largest magnitude in the sideways directions. The direction of the translational optical flow 145 is opposite the direction of travel 143. The right UAV 161 is traveling along a curved trajectory 163 and is thus both translating and rotating. Therefore, UAV 161 experiences an optical flow pattern 165 that is a combination of pure rotational optical flow (i.e. pattern 125) and pure translational optical flow (i.e. pattern 145).

Optical flow in two dimensions will now be mathematically defined. Refer to FIG. 2, which shows a UAV 201 traveling an instantaneous velocity of v in the horizontal direction 205, and at the same time rotating at the angular rate ω radians per second. Rotations in the counter-clockwise (CCW) directions are defined to have a positive sign. Suppose also that an optical flow sensor on-board the UAV is viewing an object 211 located a distance d from the UAV and at an angle θ from the direction of travel 205. The optical flow 215, depicted in FIG. 2 as a thick arrow, that would be measured in the direction of the object 211 is equal to:

$$OF = \frac{v}{d}\sin\theta - \omega \quad \text{(Equation 1)}$$

and would have the units "radians per second". The translational and rotational components of the total optical flow are visible on the right-hand side of the equation. As will be discussed next, it is ideal to separate these two components to facilitate the detection of the object 211.

To use optical flow to perceive depth when there is no rotation ω, one may use the measured optical flow OF and the known velocity v to compute the distance d from the above equation. However when there is rotation it is necessary to account for the contribution of rotation to the optical flow in Equation 1. Refer to FIGS. 3A and 3B which depict two views as seen from a UAV flying in the presence of obstacles. FIG. 3A depicts the view 301 seen when the UAV is traveling in a straight line towards the Focus of Expansion 303. FIG. 3B depicts the view 351 seen when the UAV is turning to the left at the same time as traveling in the same direction as in view 301. Each view contains a background, a large boulder on the left, a cable strung diagonally across the field of view, and a small object on the right. These views also show the resulting optical flow patterns, which are depicted as arrows whose length corresponds to the speed of the optical flow. Slower optical flows are depicted as triangles, which are essentially very short arrows.

FIG. 3A shows purely translational optical as would be experienced if the UAV is flying perfectly straight towards the focus of expansion (FOE) 303. The FOE 303 is the instantaneous direction towards which the UAV is flying. The FOE 303 is also the point from which all optical flow vectors appear to be radiating. However at the FOE 303 itself the optical flow is zero. Note that when the UAV is traveling in a straight line, the optical flow from the different objects is clearly visible. For example, the background 311 is farther away, and therefore tends to have slower optical flow, which is consistent with a larger d in the denominator of Equation 1 above. The boulder 313 has slightly faster optical flow vectors, which indicate it is closer to the UAV, and thus may be a potential threat, but likely not a significant threat since its optical flow vectors are relatively small and the boulder 313 is already on the periphery. The cable 315 has very strong optical flow vectors. This indicates that the cable 315 is very close the UAV and thus a significant threat. The spherical object 317 has optical flow vectors that are not radiating from the FOE 303. This indicates that the spherical object 317 itself is moving, and is a threat that should be monitored.

FIG. 3B shows a combination of translational and rotational optical flow from the UAV flying on a trajectory that curves to the left. Point 353 corresponds to the focus of expansion 303 of view 301. Point 353 no longer has a zero optical flow. Instead, the optical flow has a value corresponding to the negative of the angular rate of the UAV itself, as indicated by Equation 1 above. Note that when the UAV is traveling on a curved trajectory, the added rotational optical flow component makes it more difficult to detect the different hazards and separate them from the background. The optical flows from the background 361 and the boulder 363 are essentially indistinguishable. The optical flow from the cable 365 is slightly different from that of the background 361, but not so different that after noise is added it is easily separated from the background 361. The spherical object 367 also has a slightly different optical flow from the background 361. These two views demonstrate that obstacles or other hazards do not stand out against the background as well when a UAV is undergoing both rotation and translation as when a UAV is only undergoing translation.

A small UAV flying in the wind or maneuvering through tight environments will fly almost exclusively along curved trajectories. This is especially the case with rotary wing UAVs. The optical flow patterns visible from a UAV will be more like that of FIG. 3B than FIG. 3A. Therefore one significant problem with using optical flow for navigation is that of isolating the translational optical flow from the combined optical flow measured by an optical flow sensor.

A gyro may be used to measure an optical flow sensor's angular rates and provide the sensor with angular rate measurements. In the case of an optical flow sensor mounted on a UAV (or mobile robot), the gyro and the sensor may be connected to the UAV (or mobile robot) in a manner that the gyro and sensor rotate in tandem as the UAV (or mobile robot) moves and thus the gyro measures the sensor's angular rates. The construction and use of such a gyro is an established and well-known art. A gyro may be constructed from MEMS components, or any other device capable of providing the angular rate of rotation of the sensor. For purposes of discussion, a gyro is herein described as any device that may inform a sensor of its angular rates, whether by mechanics, vision, or any other sensory modality. The act of measuring angular rates along one, two, or three axes is herein defined as measuring an angular rate. Furthermore, if a sensor is being rotated in a controlled manner by an actuating mechanism, and if it is possible to inform the sensor of its angular rate, then that actuating mechanism may be considered a gyro and the information sent to the sensor may be considered to be angular rate measurements. Finally, since angular rates can comprise rotations around one, two, or three axes of rotation, the angular rates may be collectively referred to as "at least one angular rate measurement".

One simple method of separating translational from rotational optical flow is to use such a gyro to measure the UAV's rotation rates. The measured angular rates will be exactly opposite the rotational optical flow components, as shown in Equation 1 above, and thus may be subtracted from the total optical flow measurement to leave behind a translational optical flow measurement. However in practice this method fails for several reasons: First, the transient response of the optical flow sensor to changes in angular rate is typically distinct from the transient response of the gyro. Frequently an optical flow sensor's transient response to changing optical flow is non-linear, with one or more lags that may actually vary with the optical flow itself, while the gyro's transient response to changing angular rates may be linear with a single dominant pole. Because optical flow algorithms may require visual texture to move several pixels before visual motion can be measured, optical flow measurements may lag gyro measurements when a UAV undergoes maneuvers. Other features of an optical flow algorithm such as fusion may cause additional lags. Consider this example: Suppose that a UAV is undergoing one angular rate, and then abruptly starts a maneuver to turn at a different angular rate. The gyro will generally register the new angular rate almost instantaneously, subject to the gyro's bandwidth. However the optical flow sensor may require the visual texture to move at least several pixels before the optical flow sensor can adapt to the new rate. The brief period of lag between these two sensor modes will result in "spike" when the gyro measurement is subtracted from the optical flow measurement. These spike artifacts can interfere with any depth perception algorithms relying on optical flow measurements as an input.

Another problem with the above approach to removing rotational optical flow is expressed by the practical axiom "do not subtract two large numbers and expect an accurate small number". Many practical optical flow algorithms, especially CPU-efficient algorithms amenable to implementation in tiny packages, tend to have strong multiplicative noise components in addition to additive noise components. In other words:

$$OF_{measured} + OF_{actual}(1+N_{multiplicative}) + N_{additive} \quad \text{(Equation 2)}$$

where $N_{multiplicative}$ is a multiplicative noise random variable, $N_{additive}$ is an additive noise random variable, $OF_{actual}$ is the actual optical flow that should be experienced according to Equation 1 above, and $OF_{measured}$ is the optical flow measured by a sensor. The multiplicative noise random variable may have a standard deviation of 10%, 20%, or even 50% depending on the specific sensor or algorithm. When a UAV executes strong turns, such as shown in FIG. 3B, the resulting strong optical flow values will have correspondingly larger errors. Even if the gyro measurement mean and the rotation optical flow component mean cancel each other out, the large noise component of the optical flow measurement will remain.

Instead, it is preferable to either limit the rotational component of optical flow as much as possible, or remove the rotational component in a manner not adversely affected by optical flow algorithm lags or the above noise components. One simple method is to force the UAV to fly in a straight line until a hazard is detected, and then execute sharp turns away from the obstacle. This is, in fact, the apparent strategy used by the drosophila (fruit fly). However flight along a straight line is not practical for most UAV scenarios, in particular ones that may fly in near-Earth environments.

Therefore, one fundamental weakness with the optical flow sensors described in U.S. Pat. Nos. 6,020,953 and 6,384,905 and in the other above-referenced work is that although they are able to measure optical flow in a compact and practical package, they can only sense the combined optical flow resulting from the sum of rotational and translational components, and are not able to directly measure just the translational optical flow component. This weakness reduces the practicality of such sensors when used on UAVs or other platforms undergoing complex maneuvers.

Prior Art in Optical Flow Sensors

Before discussing the prior art of optical flow sensors, consider the difference between optical flow and image flow. Generally speaking, optical flow refers to the angular rate of motion of texture in the visual field that results from relative motion between a vision sensor and other objects in the environment. Image flow refers to the rate at which the image appears to move on the focal plane of an imager. Image flow and optical flow are related by trigonometry, as discussed in greater detail below with FIGS. 7A and 7B. However for the following discussion on the prior art, the term "optical flow" will be loosely used in a manner that does not distinguish between these two types of visual motion. This is to keep the discussion consistent with that of the above-referenced prior art and with much of the optical flow literature. The discussion will resume to the more precise definitions of optical flow and image flow below when FIGS. 7A and 7B are discussed.

Consider now the prior art in optical flow sensors. Refer to FIG. 4A, which shows a generic optical flow sensor 401 for computing optical flow. The sensor 401 is divided into a four-part architecture, which may be considered a generalization of the sensors described in the above-referenced prior art. A lens 403 focuses light from the visual field 405 to form an image on a vision chip 407. The lens 403 may be a standard simple or compound lens, or may be any other optical structure configured to form an image on the vision chip 407. The lens 403 is mounted a predetermined distance, called the "focal length", from the vision chip 407. The vision chip 407 is divided into an array of pixels, each pixel representing a small portion of the image. The pixels may also be referred to as photoreceptors, with the resulting values associated with each pixel referred to as a photoreceptor signals. Therefore an initial step performed by the vision chip 407 is to convert the image into an array of photoreceptor signals 409, which is performed by the photoreceptor array 411 on the vision chip 407.

The output of the photodetector array 411 may form a typical image or "snapshot" of the environment much like that generated by the imager of a digital camera or camcorder. Therefore the set of photoreceptor signals generated by an imager or a vision chip may equivalently be referred to as an image, and vice versa. Furthermore the act of grabbing an image may be referred to as the act of generating photoreceptor signals or an image from the visual field, whether performed with a lens or other optical structure. Note that in the discussion below, the words "imager" and "vision chip" may be used interchangeably, with "imager" referring to a device that grabs an image, and "vision chip" referring to a device that both grabs an image and performs some processing on the image. Thus a vision chip may be considered to be an imager.

In the context of U.S. Pat. Nos. 6,020,953 and 6,384,905 these photoreceptors may be implemented in linear arrays, as further taught in U.S. Pat. No. 6,194,695. Photoreceptors may also be implemented in regular two-dimensional grids or in other array structures as taught in U.S. Pat. Nos. 6,194,695, 6,493,068, and 6,683,678. Circuits for implementing such photoreceptors are described in these patents.

The second part of the sensor 401 is an array of feature detectors 415. This feature detector array 415 generates an array of binary feature signals 417 from the photoreceptor signals 409. The feature detector array 415 detects the presence or absence of feature such as edges in the visual field (or image on the vision chip or imager). On most prior art image processing systems, feature detectors are implemented with software algorithms that process pixel information generated by an imager or vision chip. On the optical flow sensors described in U.S. Pat. Nos. 6,020,953 and 6,384,905, feature detector arrays are implemented with circuits such as winner-take-all (WTA) circuits within the vision chip. In these patents, the resulting winner-take-all signals may be referred to as binary feature signals. The resulting binary feature signals 417 may be analog or digital, depending on the specific implementation. For purposes of discussion, feature detector signals may be described as comprising a single digital bit, with each signal corresponding to a specific location of the visual field. The bit may be digital "1" to indicate the presence of a feature at that location of the visual field (or image on the vision chip or imager), and may be digital "0" to indicate the absence of a feature at that location. Note that alternative embodiments that generate either multi-bit information or analog signals may still be considered within the scope of the current teaching.

The third part of the sensor 401 is an array of motion detectors 423, where the motion of features across the visual field 405 is detected and the speed measured. These motion detectors may be implemented as algorithms that exist on a processor 421, although some of the prior art (also discussed in U.S. Pat. No. 6,020,953) teaches variations in which motion detectors may be implemented as circuits on the same vision chip 407 as the photodetectors 411 and feature detectors 415. The motion detectors 423 generate "velocity reports" 425, with each velocity report corresponding to a single instance of a measured optical flow value.

Algorithms for motion detection include "transition detection and speed measurement", as taught in U.S. Pat. Nos. 6,020,953 and 6,384,905. Other methods of motion detection are discussed in the above-referenced Ph.D. dissertation by Barrows. In these algorithms, sequential frames of binary feature signals are grabbed from a vision chip, and motion detection algorithms are implemented every frame using a state machine. At any single frame, zero, one, or more velocity reports may be generated. Over the course of multiple frames, velocity reports are generated as visual motion occurs. Therefore it is said that the motion detectors generate multiple velocity reports, even though these velocity reports do not necessarily occur at the same time. Velocity reports are also discussed below with FIG. 6.

The fourth part of the sensor 401 is the fusion section 431, where the velocity reports 425 are processed and combined to produce a more robust and usable optical flow measurement 435. This measurement 435 may be a single optical flow measurement corresponding to the field of view of sensor 401, or may be an array of measurements corresponding to different subsections of field of view. Fusion is also generally, but not necessarily, performed on the processor 421. Fusion is the primary subject of U.S. Pat. No. 6,384,905. In U.S. Pat. No. 6,384,905, fusion is the process implemented in Steps 192 through 199 as described in column 14 of the patent's specification, or on Steps 175 through 177 as described in column 15 of the patent's specification.

The above optical flow sensor 401 may also be described as a process or a method. Refer to FIG. 4B, which shows a five step process 451 that corresponds to the four parts of the sensor 401. One cycle of this process corresponds to one "frame" grabbed by the sensor 401. This process 451 is described step by step below.

Step 461, Initialization: In this step, the optical flow algorithms are initialized and the algorithm variables are set to the initial default values.

Step 463, Grab Image: In this step, photodetector signals, or equivalently pixel signals, are generated from the visual field. This step corresponds to the function performed by the lens 403 and photodetectors 411 of sensor 401.

Step 465, Generate Binary Feature Signals: In this step, binary feature signals are generated from the photodetector signals generated in Step 463. This step corresponds to the function performed by the feature detector array 415 of sensor 401.

Step 467, Generate Velocity Reports from Feature Signals: In this step, the binary feature signals generated in Step 465 are analyzed in order to detect the motion of features across the visual field. Such visual motion would cause corresponding digital "1" values to appear to move across the binary feature signals. As taught in U.S. Pat. Nos. 6,020,953 and 6,384,905, the process of detecting the motion may span multiple frames and thus multiple iterations of this step, and may be performed with a state machine. When motion is detected, one or more velocity reports may be generated. It should be noted that at any single iteration of this step, zero, one, or more velocity reports may be generated. However as motion occurs, multiple velocity reports will be generated over time. Therefore when it is said that this step produces multiple velocity reports, it is in the context of multiple iterations of this step over time. This step corresponds to the function performed by the motion detectors 423 of sensor 401.

Step 469, Fuse Velocity Reports to Form Optical Flow Measurement: In this step, the individual velocity reports generated in Step 467 are fused to form one or more useful optical flow measurements. This step may also use velocity reports generated in previous iterations in order to create the optical flow measurements. This step corresponds to the function performed by the fusion part of sensor 401. The process then loops back to Step 463.

Refer to FIG. 5, which depicts a 6-by-6 array of binary feature signals 501 as might be generated by the feature detectors 415 of FIG. 4A or Step 465 of FIG. 4B. For discussion, only a 6-by-6 array is shown, although the array may be much larger. In this case, consider the array 501 as a subset of the entire array of binary feature signals generated. Each binary feature signal in the figure is represented either as an open circle for an "off" pixel (for example "off" pixel 503) or as a closed circle for an "on" pixel (for example "on" pixel 505). "On" and "off" values correspond respectively to the presence or lack of a feature at the corresponding location the visual field. For example, the feature may be an "edge" and the pixel's binary value would then indicate the presence or absence of an edge at that location of the visual field. The array 501 of binary feature signals may be considered to be a "binary image".

One method for measuring optical flow is to track the motion of high feature detector signals across the visual field. Refer to FIG. 6, which shows another binary feature array 601 of essentially the same type as FIG. 5, but depicts a single "on" signal moving through a trajectory 603 that is two pixels wide. Due to motion in the visual field, this "on" pixel starts at a start location 605, travels along trajectory 603 through location 606, and finishes at end location 607. If this distance of two pixels is divided by the time used to move this distance, the result is a "velocity report". For example, if the time used to move two pixels was 100 milliseconds then the velocity report in this case would be 2/0.1=20 pixels per second.

In an actual implementation, there are many such trajectories that can cause a velocity report. For example, it is possible to define another trajectory as starting at location 607, passing through location 608, and ending at location 609. A reverse trajectory, indicating motion to the left, may be defined that starts at location 609, passes through location 608, and ends at location 607. Such a reverse trajectory would indicate motion in the opposite direction, and may accordingly be given a negative sign. Yet another trajectory may be defined as starting from location 611, passing through location 612, and ending at location 613. To obtain maximum sensitivity to motion, all such trajectories possible over the array 601 may be measured, so that motion anywhere may generate a velocity report. Shorter trajectories just one pixel long may be defined, for example from location 613 to location 621. Likewise longer trajectories may be defined, such as the three pixel long trajectory start at location 611 and ending at location 621. Vertical trajectories may be defined, for example involving locations 621, 622, and 623. Any time an edge moves through a trajectory that the motion detector is configured to detect, a velocity report may be generated, with the velocity report being a distance-divided-by-time measurement.

In the context of U.S. Pat. No. 6,020,953, velocity reports are the outputs of the "Transition Detection and Speed Measurement" circuit of FIG. 5 of this Patent, which result from "valid transitions", as defined in this patent. Steps 357, 359, and 365 of FIG. 16 also define a velocity report, as output by the variables "speed" and "direction" in Step 361. The trajectories defined in this patent cover one pixel of distance. Many such transition detection and speed measurement circuits may be implemented over the entire array to obtain maximum sensitivity to motion.

In the context of the above referenced U.S. Pat. No. 6,384,905, velocity reports are the variables m(j) computed by the function TIME_TO_VEL( ) on program line 174, shown in column 15 of U.S. Pat. No. 6,384,905. This value is referred to as a "velocity measurement" in this patent. The trajectories defined in this patent also cover one pixel of distance. To achieve greater sensitivity to motion, the algorithm implemented in this patent may be replicated across the visual field.

Trajectories over one or more pixels in length may be monitored using one of many different techniques that exist in the open literature to track the motion of a high digital signal over time. Possibilities include using state machines to detect motion across a trajectory and timers or time stamps to record how much time was necessary to move through the trajectory. A possible state machine may be configured to detect motion along the (location 605)->(location 606)->(location 607) trajectory, or the motion in the opposite direction, in order to detect motion. The state machine may output a command to grab a starting time stamp when, for example, location 605 is high, and may then output a command to grab an ending time stamp and generate a velocity report when, for example, the high signal has moved through the trajectory 603 to location 607. The state machine may also output a sign bit to indicate the direction of motion detected. Some additional mechanisms for detecting such longer features are discussed in the above-referenced Ph.D. dissertation by Barrows.

This velocity report may be converted to a measurement in "radians per second" from the angular pitch between neighboring pixels when projected out into the visual field. If $v_p$ is the velocity report in "pixels per second", f the focal length of the lens 403, and p the pitch between pixels, then the velocity report $v_r$ in "radians per second" is (to a first-order approximation)

$$v_r = \frac{p}{f} v_p. \quad \text{(Equation 3)}$$

This value can be converted to a "degrees per second" by multiplying $v_r$ by $180/\pi$.

Note that although the above discussion of FIGS. 5 and 6 use binary feature arrays arranged on a square grid, other type of arrays are possible. For example, in the context of U.S. Pat. Nos. 6,020,953 and 6,384,905, photoreceptor arrays and binary feature detector arrays are arranged in predominantly a linear pattern for computing one-directional optical flow. In these cases, the binary feature detector arrays 501 and 601 would be one-dimensional, and the trajectories would be strictly along the array.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, wherein:

FIGS. 4A and 4B respectively show prior art. FIG. 4A shows a prior art optical flow sensor, while FIG. 4B shows a prior art optical flow sensing method.

FIG. 5 shows a 6-by-6 array of binary feature signals

FIG. 7A shows the camera system itself, while FIG. 7B shows a lens and an imager.

CONVENTIONS AND DEFINITIONS

Coordinate System

Figure 7:
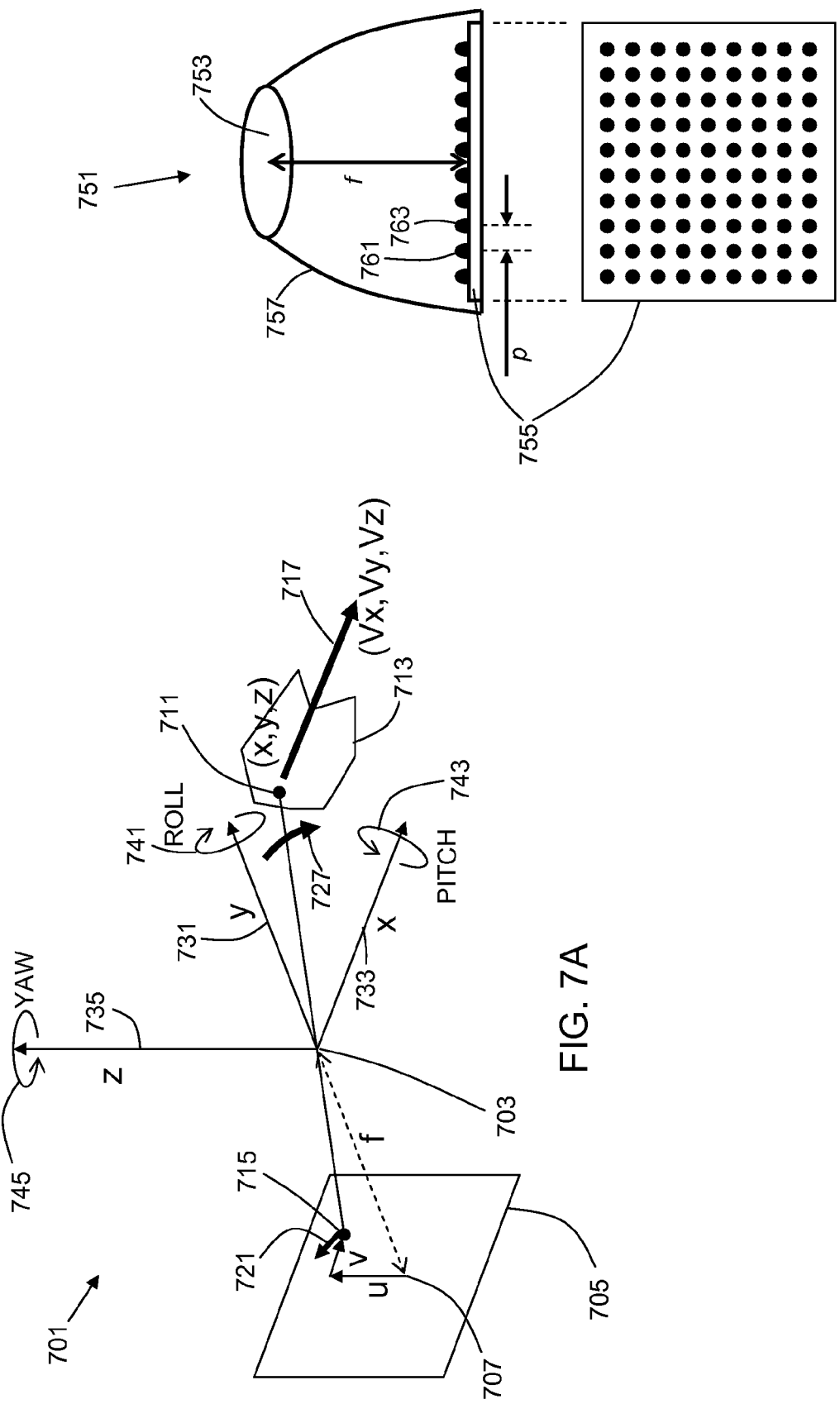
FIGS. 7A and 7B show the camera coordinate systems that will be used in this document.

Before describing exemplary embodiments, it is appropriate to define a coordinate system and describe optical flow in a mathematical fashion. Note that this is just one coordinate system of many that can be defined, and therefore the scope of the teachings herein should not be considered restricted to those using the coordinate system described below. Likewise, other methods of forming an image or focal plane may additionally be considered. Refer to FIG. 7A, which shows a coordinate system 701 used for this discussion. This coordinate system models pinhole optics, in which the origin 703 is located at a pinhole or lens of an optical system, and a focal plane 705 is positioned perpendicular to the y-axis as shown in the figure, and centered at point 707 at $(x,y,z)=(0,-f,0)$. The imager or vision chip 407 of FIG. 4A would generally be placed at the focal plane 705. The value f is referred to as the "focal length" of the imaging system, and is defined as the distance between the lens 403 (or equivalent pinhole) and the focal plane 705. The coordinate system (u,v) defines locations on the focal plane. Suppose that there is a point (x,y,z) 711 located on object 713 in the environment. Via pinhole optics, the point 711 will project to the point 715 at $u=-fz/y$ and $v=-fx/y$ on the focal plane 705. A typical unit for f, u, and v is microns or millimeters, while (u,v) space on the focal plane 705 is quantized by the pitch p between pixels on the focal plane, the value of p typically measured in microns. The discussion below will use both the terms "focal plane" and "(u,v) space" to refer to focal plane 705.

Images

Consider an imaging system or vision chip in which the imaging space or focal plane is quantized into pixels. Refer to FIG. 7B, which shows a simple camera system 751, comprising a lens 753, an imaging chip 755, and an optical enclosure 757 holding the lens 753 a fixed distance above the imaging chip 755. This imaging chip 755 corresponds to the imager or vision chip 407 of FIG. 4A. The distance between the lens 753 and the imaging chip 755 is the above-defined focal length f The imaging chip 755 is generally located at the focal plane 705 of FIG. 7A. The imager 755 and its lens 753 will have a visual field that depends on the focal length f and the size of the imager 755. The imaging chip 755 has an array of pixel elements, including pixel 761, pixel 763, and so on. The pixels are depicted as bumps on the imager 755 but in reality would generally be embedded in the imager 755. Let the value p denote the pixel pitch or the distance between two adjacent pixels, such as pixels 761 and 763, on the focal plane. Thus in an imager (u,v) is quantized into pixels located p apart in (u,v) space. Let the value $I_{m,n}$ denote the value of pixel located at $(u,v)=(mp,np)$. Thus the m and n directions are equivalent to the u and v directions in (u,v) space. Note that m and n can be positive or negative integers or zero. Let the maximum and minimum m values of I be respectively $I_m^{min}$ and $I_m^{max}$. Let the maximum and minimum n values be respectively $I_n^{min}$ and $I_n^{max}$.

In the present teaching, the matrix I will be used to denote an image generated from raw pixels. Additionally, the matrix B to denote an image of substantially binary feature signals generated by a feature detector array, such as the feature detector array 415 of FIG. 4A. Associated with matrix B are the variables $B_{m,n}$, $B_m^{min}$, $B_m^{max}$, $B_n^{min}$, and $B_n^{max}$ having a similar meaning as those of I. Note that $B_{m,n}$ denotes the binary feature signal corresponding to the pixel $I_{m,n}$.

Image Flow

Suppose the object 713 is moving at a linear velocity $(v_x, v_y, v_z)$ 717 through the environment, and suppose that there is no other motion in the coordinate system 701 of FIG. 7A. This will result in a corresponding image flow 721 at the corresponding point (u,v) on the focal plane 705. The "image flow" refers to the motion in (u,v) space on the focal plane 705 resulting from the motion of point 711. This is distinct from optical flow, which is described below. The resulting image flow is purely translational image flow, since the camera itself is not undergoing any rotation. The translational image flow due to the moving object is simply:

$$\dot{u}_t = \left(\frac{-v_z}{y} + \frac{v_y z}{y^2}\right) f = \left(\frac{v_y z}{y} - v_z\right)\frac{f}{y} \quad \text{(Equation 4)}$$

and $$\dot{v}_t = \left(\frac{-v_x}{y} + \frac{v_y x}{y^2}\right) f = \left(\frac{v_y x}{y} - v_x\right)\frac{f}{y}. \quad \text{(Equation 5)}$$

If one assumes a "narrow field of view" approximation, where x<<y and z<<y, and thus $(1+u^2/f^2) \approx 1$ and $(1+v^2/f^2) \approx 1$, then one can approximate the translational image flow as $$\dot{u}_t \approx -\frac{v_z}{y} f \quad \text{(Equation 6)}$$

and $$\dot{v}_t \approx -\frac{v_x}{y} f. \quad \text{(Equation 7)}$$

The narrow field of view approximation is useful when the field of view of the imaging system is adequately small that first order approximations can be used for computing sinusoid function. The narrow field of view assumption is a method of obtaining a first-order approximation. Depending on the specific application and desired degree of accuracy, the small field of view assumption may be appropriate when a sensor's or imager's field of view is on the order of 45 degrees wide or less.

In many scenarios it is not the object 713 that is moving at a linear velocity, but the vision system itself. This is accounted for by establishing the origin 703 as the frame of reference and measuring all positions and velocities relative to the origin 703 rather than the other way around. In other words, instead of having the imaging system translate at a velocity of $(-v_x, -v_y, -v_z)$ and the object stationary, reframe the scenario so that the imaging system is stationary and the object is translating at a velocity of $(v_x, v_y, v_z)$.

Now suppose that the object 713 is stationary and the sensor system is remaining in one place, but additionally the sensor system is undergoing rotation about it's x axis (733), y axis (731), and z axis (735) at respective rates of $\omega_x$, $\omega_y$, $\omega_z$, respectively the pitch rate 743, roll rate 741, and yaw rate 745. Positive rotation about an axis is determined by the "right-hand rule", where a human grabs the axis with his or her right hand with the thumb pointing in the positive direction. The direction the fingers wrap around the axis is the direction of positive rotation. The image flow 721 will be purely rotational. The resulting rotational components of the image flow 721 will be:

$$\dot{u}_r = \omega_x\left(1 + \frac{u^2}{f^2}\right)f + v\omega_y = \omega_x\left(f + \frac{u^2}{f}\right) + v\omega_y \quad \text{(Equation 8)}$$

and $$\dot{v}_r = -\omega_z\left(1 + \frac{v^2}{f^2}\right)f - u\omega_y = -\omega_z\left(f + \frac{v^2}{f}\right) - u\omega_y. \quad \text{(Equation 9)}$$

The negative sign in Equation 9 is due to the definition of the axis of rotation. The respective narrow field-of-view approximations are:

$$\dot{u}_r \approx \omega_x f + v\omega_y \quad \text{(Equation 10)}$$

and $$\dot{v}_r \approx \omega_z f - u\omega_y. \quad \text{(Equation 11)}$$

Finally, suppose that both the object 713 is moving and the image system itself is rotating so that both rotational and translational optical flow are present. The total image flow measured by the sensor will be:

$$\dot{u} = \dot{u}_t + \dot{u}_r \quad \text{(Equation 12)}$$

and $$\dot{v} = \dot{v}_t + \dot{v}_r \quad \text{(Equation 13)}$$

Optical Flow

As described above, image flow refers to the motion of a point 715 in (u,v) space on the focal plane 705, which corresponds to the point 711 on object 713 in the visual field. The optical flow 727 is the apparent angular motion of this point 715 projected back out into the visual field. For discussion purposes, define the optical flow component $OF_u$ to be the optical flow in the vertical direction, seen as a negative pitch rate, and optical flow component $OF_v$ to be the optical in the horizontal direction, seen as a positive yaw rate. When viewing from the origin 703 out along the positive y axis 731 with the positive z axis 735 being "up", positive $OF_u$ optical flow appears to be moving "down" while positive $OF_v$ optical flow appears to be move "left". These values respectively are:

$$OF_u = \frac{\dot{u}}{f\left(1 + \frac{u^2}{f^2}\right)} = \frac{\dot{u}}{\left(f + \frac{u^2}{f}\right)} \quad \text{(Equation 14)}$$

and $$OF_v = \frac{\dot{v}}{f\left(1 + \frac{v^2}{f^2}\right)} = \frac{\dot{v}}{\left(f + \frac{v^2}{f}\right)}. \quad \text{(Equation 15)}$$

If the small field of view approximation is used, these values respectively are $$OF_u \approx \frac{\dot{u}}{f} \quad \text{(Equation 16)}$$

and $$OF_v \approx \frac{\dot{v}}{f}. \quad \text{(Equation 17)}$$

As mentioned above in the prior art section, the above definitions of optical flow and image flow are related but subtly different from each other. In the above discussion of the prior art and in U.S. Pat. Nos. 6,020,953 and 6,384,905 the term "optical flow" and "image flow" are used interchangeably without recognizing this distinction. Starting above with the definition of coordinate systems and continuing to the end of the teachings herein, the more precise definitions of optical flow and image flow are used.

Note that the above teachings and prior art may specify the use of a single lens for focusing an image. Any optical aperture can be used in place of a lens, for example a compound lens constructed from multiple imaging elements, a slit aperture, or even a simple pinhole. Note further that an image need not be formed on a strictly flat focal plane such as focal plane 705 of FIG. 7. For example, the image forming surface can be curved, as is implemented in the human eye, or it may have another shape. All such alternative optical apertures are considered within the scope of the current teaching. Likewise all surfaces on which images may be formed and grabbed, whether flat or not, shall be considered a "focal plane" for the purpose of defining the scope of the current teachings.

Description of the First Exemplary Embodiment

We have given the name "velocity report compensation" to the technique used in the first exemplary embodiment. This technique involves making adjustments to individual "velocity reports" to subtract out the rotational component of each velocity report. The remainder is a velocity report that contains substantially only translational optical flow. This resulting velocity report is called a "translational velocity report". This technique, which makes the first exemplary embodiment, is described below.

For this technique to be used, it is assumed that there is a gyro or some other device configured to provide angular rate measurements, as defined above. In practical use on a UAV or a mobile robot, the gyro may be a gyro suite as part of an IMU (inertial measurement unit) that is attached to the same frame as the optical flow sensor, so that the gyro and the sensor undergo the same rotation. Note that it may be necessary to rotate or otherwise transform the gyro measurements so that the sensor has access to roll 741, pitch 743, and yaw 745 rates with respect to the sensor's own coordinate system 701. If multiple sensors are present, each sensor may need to be provided with these angular raters in its own coordinate system.

Overview

Figure 8:
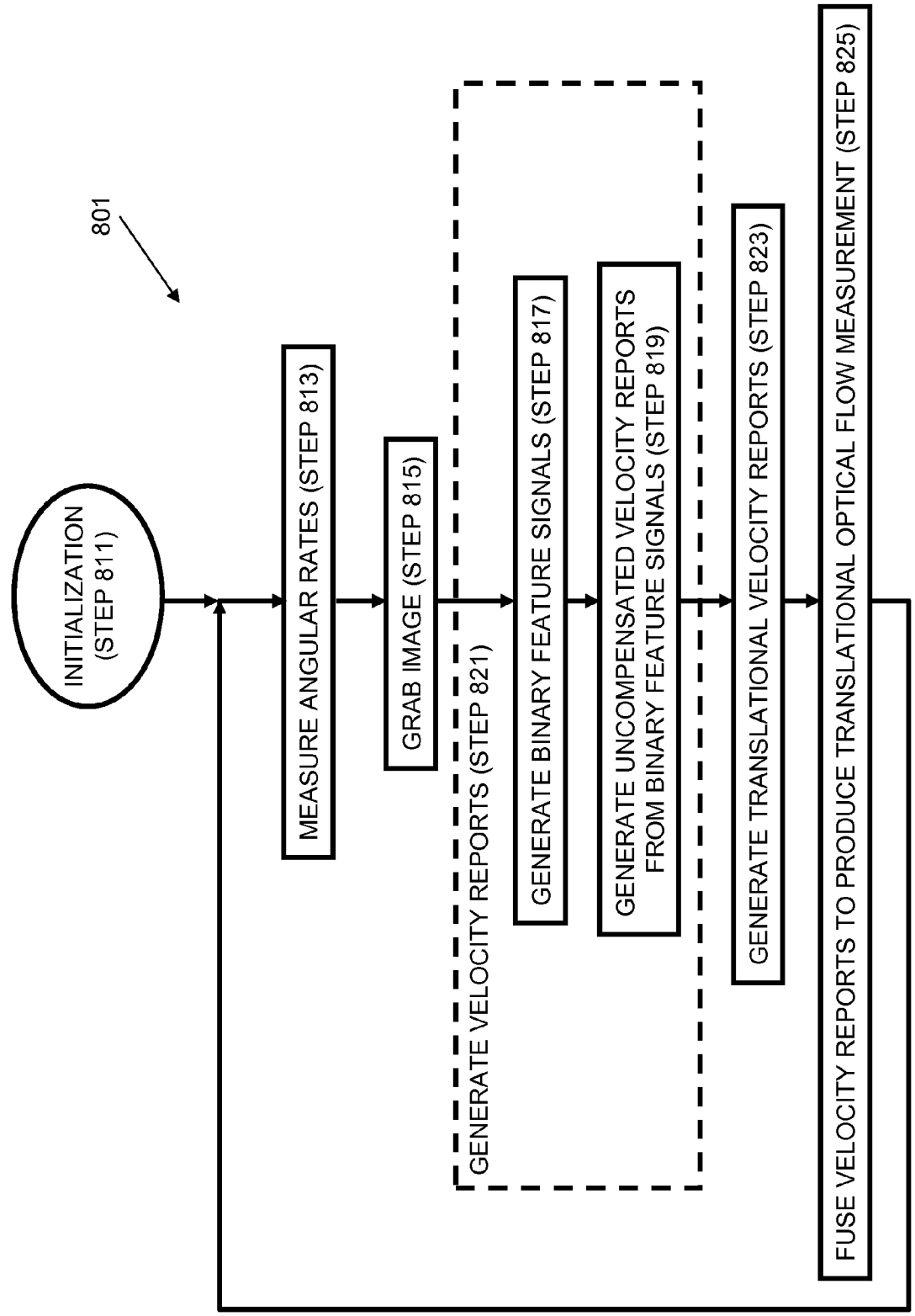
FIG. 8 shows a first exemplary method for computing translational optical flow.

Refer to FIG. 8, which depicts the first exemplary embodiment 801 of a method for computing translational optical flow. This embodiment comprises seven main steps for computing translational optical flow.

Step 811, Initialization: The first step is to initialize the optical flow algorithms. This step may be performed in a manner similar to that of Step 461 above.

Step 813, Measure Angular Rates: The second step is to measure and record the angular rates that the optical flow sensor is experiencing at the time instant this step is executed. These angular rates may be measured by a gyro, as defined above. These angular rates are then stored for later use in Step 823, below. For purposes of definition, the act of measuring an angular rate herein may include the additional steps of recording one or more angular rates for later use, or equivalently the step of adding the angular rate measurement to a record of angular rates.

Step 815, Grab Image: The next step is to grab an image from the visual field and generate photoreceptor signals. This step may be performed in a manner similar to that of Step 463 of FIG. 4B, and may be performed using an imager or a vision chip with an appropriate lens or other optical apparatus.

Step 817, Generate Binary Feature Signals: The next step is to generate an array of binary feature signals from the photoreceptor signals. This step may be performed in a manner similar to that of Step 465 of FIG. 4B. Any apparatus configured for generating the binary feature signals from the image or from the photoreceptor signals, whether by a prior-art feature detector array (e.g. feature detector array 415 of FIG. 4A) or otherwise, may be referred to as a feature detector array.

Step 819, Generate Uncompensated Velocity Reports from Binary Feature Signals: The next step is to generate uncompensated velocity reports from the binary feature signals. This step may be performed in a manner similar to that of Step 467 of FIG. 4B. However the resulting velocity reports are referred to here as "uncompensated" velocity reports because they have not yet been compensated for rotation. Note that like Step 467, at any single iteration of Step 819 zero, one, or multiple velocity reports may be generated, depending on what visual motion has occurred in recent time. However over multiple iterations of Step 819 multiple velocity reports will be produced over time. Therefore the plural "velocity reports" is used in the name of this step. Any apparatus configured for generating the uncompensated velocity reports form the binary feature signals, whether by performing Step 819 or otherwise, may be referred to as a motion sensing apparatus.

Note that the two Steps 817 and 819 may be combined into on larger step 821 in which uncompensated velocity reports, or data values having a similar function as velocity reports, are generated from photoreceptor signals. This step 821 may be any step or group of steps that creates uncompensated velocity reports from the photoreceptor signals.

Note also that the Steps 815, 817, and 819 may be combined into a larger step for generating uncompensated velocity reports from the visual field. Such a step for generating uncompensated velocity reports from the visual field may be any step or group of steps that creates uncompensated velocity reports from the visual field. Any apparatus configured for generating the uncompensated velocity reports from the image, whether by performing Steps 815, 817, and 819 or otherwise, may be referred to as an uncompensated velocity report generating apparatus.

Note also that it is possible to define a step for generating binary feature signals from the visual field, which may comprise both steps 815 and 817.

Step 823, Generate Translational Velocity Reports. This is the step in which the uncompensated velocity reports generated previously are combined with the angular rate measurements to generate translational velocity reports. Both the current angular rate measurement and any record of angular rate measurements, if available, may be used. Every velocity report may be considered a pair of data values, the first data value being the distance and direction an edge or other feature traveled in (u,v) space, and the second value the amount of time used to travel this distance, which will be called the time interval. Each uncompensated velocity report may be converted into a translational velocity report as follows: First, analyze angular rate measurement, or the record of angular rate measurements, to determine how much the sensor system rotated over the uncompensated velocity report's time interval. This value is the total rotation that occurred during the time interval preceeding the velocity report. Second, determine how much of the uncompensated velocity report's distance was due to rotation, to generate a rotation component of the velocity report's distance value. Third, subtract the rotation component of the distance from the velocity report's distance to compute the translational distance component. Fourth, divide the translational distance component by the time interval. The quotient becomes the translational velocity report. This process of removing the rotational component from the uncompensated velocity reports is referred to herein as the process of "compensating the uncompensated velocity reports for rotation". Note that this step may equivalently be referred to as a step for generating translational velocity reports from the uncompensated velocity reports and from one or more angular rate measurements. Any apparatus configured for generating the translational velocity reports from the uncompensated velocity reports and angular measurements, whether by performing Step 823 or otherwise, may be referred to as a rotation compensation apparatus.

Step 825, Fuse Velocity Reports to Produce Translational Optical Flow Measurement. In this step fusion is performed to combine the translational velocity reports into one or more translational optical flow measurements. This step may be performed in a manner similar to that of Step 469 from FIG. 4B, except that fusion would be performed with the translational velocity reports rather than the uncompensated velocity reports. Note that depending on the specific configuration of this fusion step, one or more translational optical flow measurements may be generated. Any apparatus configured for generating the translational optical flow measurements from the translational velocity reports, whether by performing Step 825 or otherwise, may be referred to as a fusing apparatus. The algorithm then goes back to execute Step 813 and repeat the entire loop.

The translational optical flow measurement may be used to perform depth perception using Equation 1, where the value $\omega$ is zero since rotation has been removed from the optical flow measurement.

In summary, the implementation of Steps 811, 815, 817, 819, and 825 may be performed in a manner similar to that the prior art method 451 of FIG. 4B. Step 813 is essentially a record-keeping step where angular rates are recorded. Step 823 is a step where translational optical flow is extracted.

It is now appropriate to discuss the calculation of Step 823 in greater mathematical detail and in a manner referring to the coordinate system 701 of FIG. 7A. Four cases are described, three cases corresponding to rotation about one of the three axes and one case corresponding to rotation about more than one axis.

Case 1, Rotation Only Around Z-Axis

Figure 1:
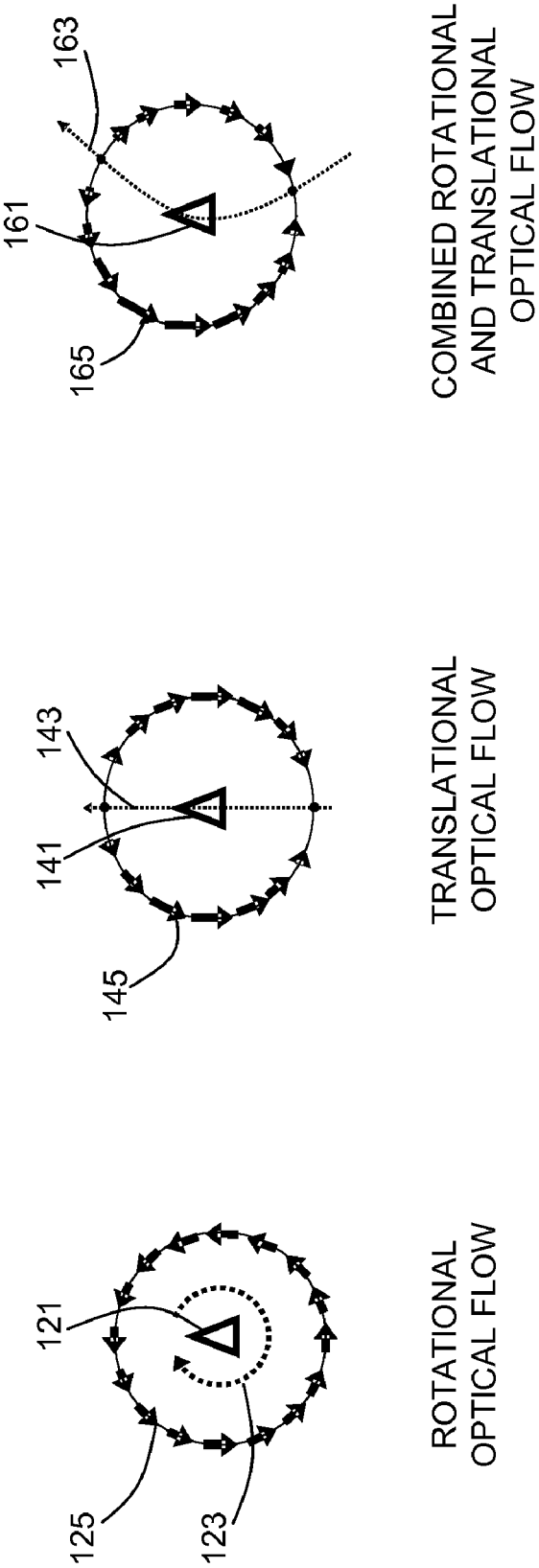
FIG. 1 shows a micro air vehicle (UAV) undergoing three types of motion, and the three resulting optical flow fields.
Figure 2:
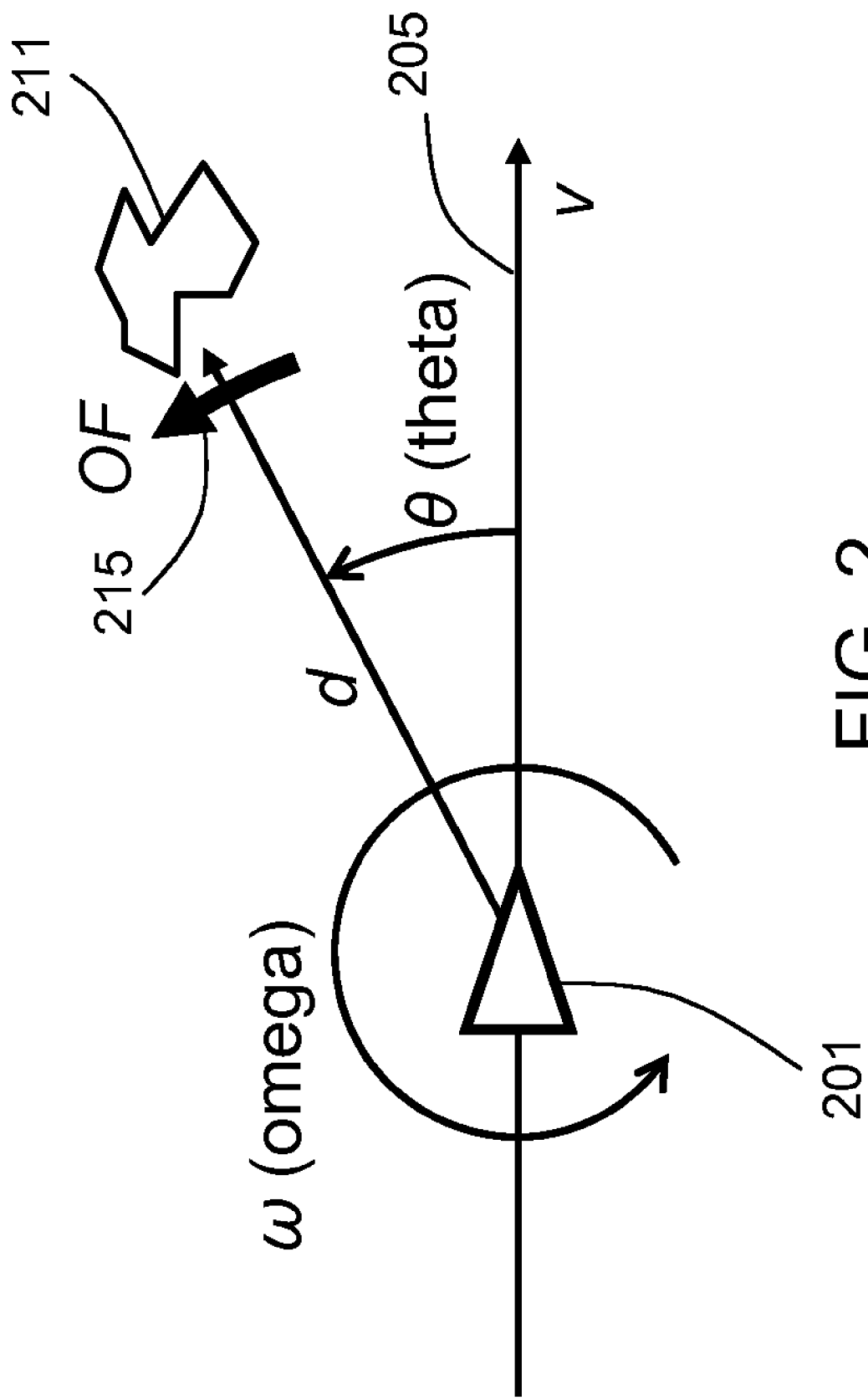
FIG. 2 shows a UAV undergoing translation and rotation, and the resulting optical flow due to an object nearby the UAV.
Figure 3B:
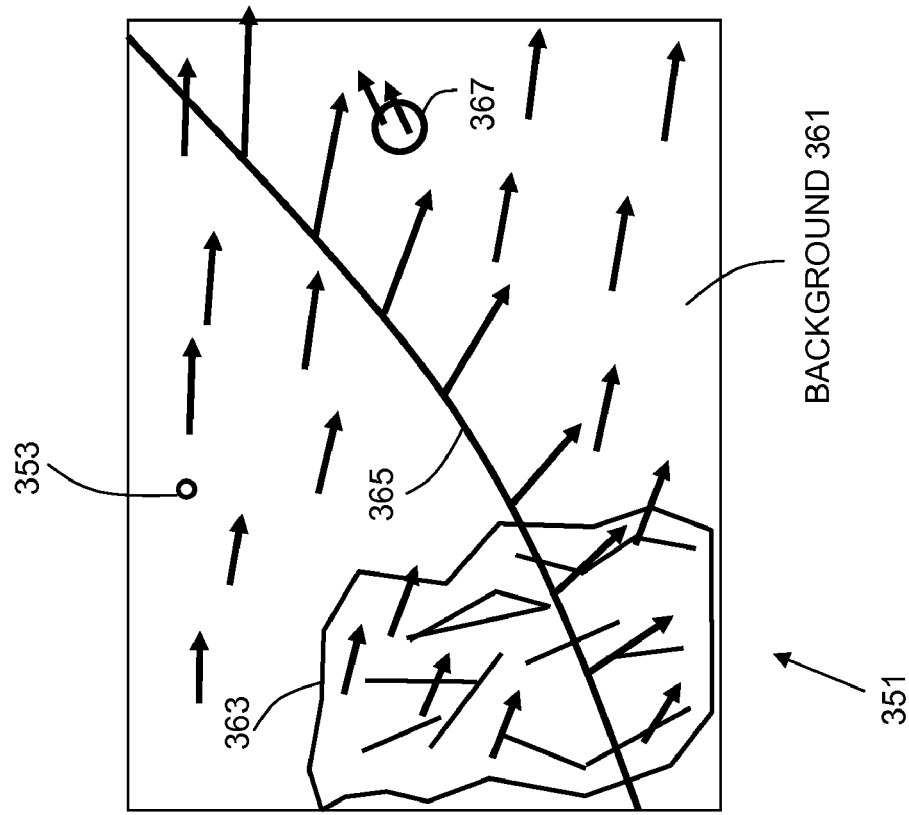
FIGS. 3A and 3B respectively show optical flow resulting from pure translation and a combination of translation and rotation.
Figure 3A:
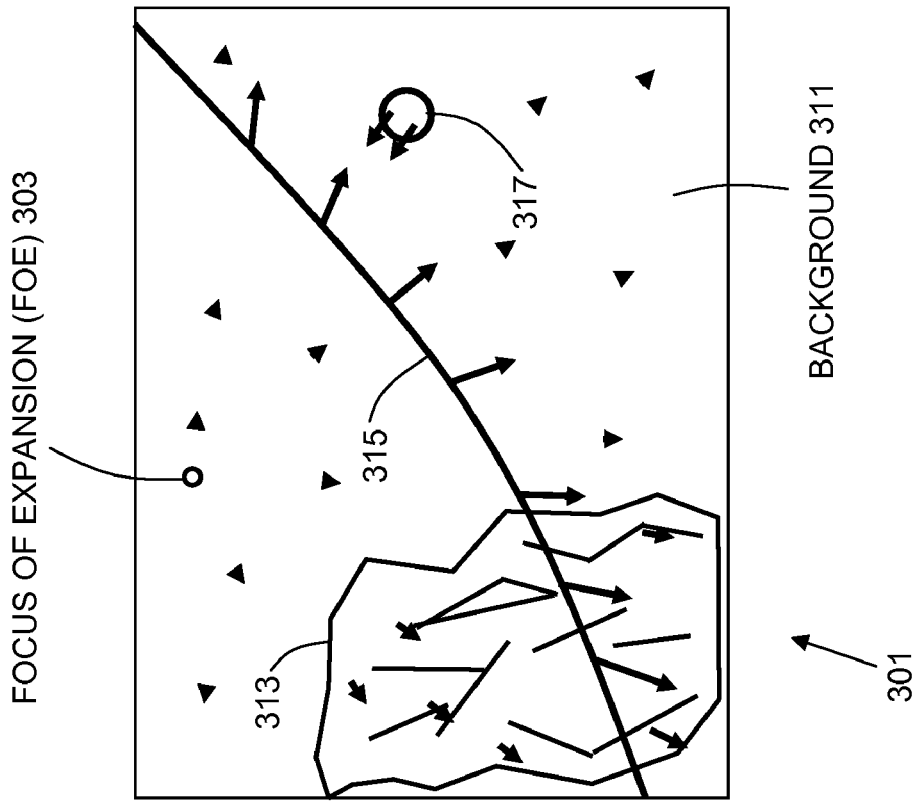
Figure 6:
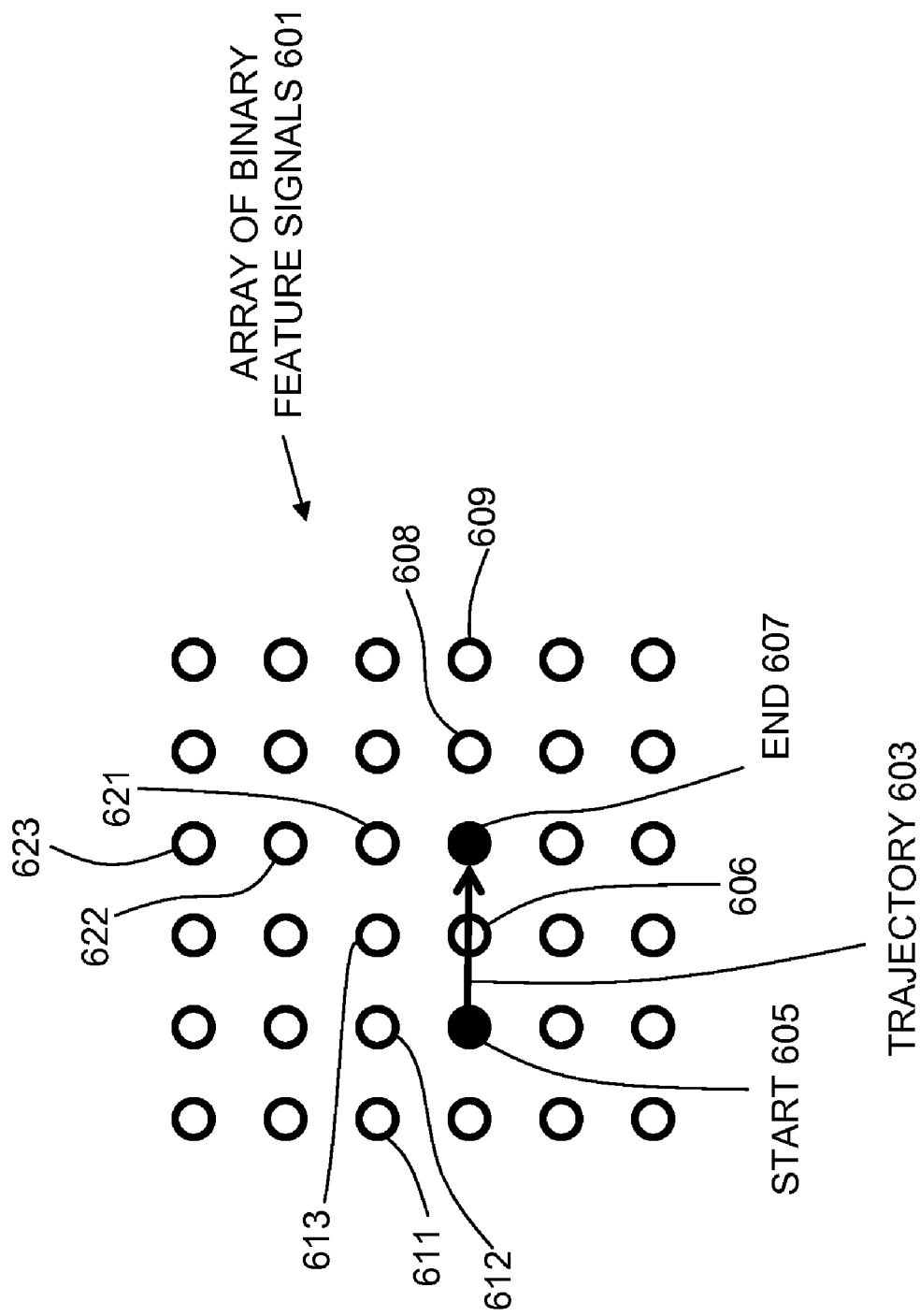
FIG. 6 shows a trajectory traced by a high binary feature signal.

First consider the case of only yaw rotation 745 along the z-axis 735 and measuring optical flow in the $OF_v$ direction. Suppose an edge or another feature on the focal plane 705 moves a path $\Delta v$ wide, in the v direction, and centered at a point (u,v) on the focal plane 705. This path may correspond to a path much like trajectory 603 of FIG. 6 with $\Delta v$ being the distance portion of the velocity report, and the sign of $\Delta v$ corresponding to the direction of motion. Assume that $\Delta v$ is significantly smaller than the focal length f i.e. $\Delta v << f$. Suppose the feature took $\Delta t$ time to move across this path. This value $\Delta t$ is the time interval associated with the velocity report. The uncompensated velocity report sent to fusion algorithms would be $$OF_v = \frac{\Delta v}{\Delta t\left(1+\frac{v^2}{f^2}\right)f} = \frac{\Delta v}{\Delta t\left(f+\frac{v^2}{f}\right)} \quad \text{(Equation 18)}$$

or $$OF_v \approx \frac{\Delta v}{f\Delta t} \quad \text{(Equation 19)}$$

using the small field of view approximation.

To extract the translational distance component, first find out how much of the motion was due to rotation. Suppose that during this time, the imager rotated by $$\theta_z = \int_{t_1}^{t_2} \omega_z dt \quad \text{(Equation 20)}$$

radians about the z-axis, where $t_1$ and $t_2$ are respectively the times when the edge started at a start location (for example start location 605 in FIG. 6) and stopped traveling along the $\Delta v$ path (for example at a stop location like location 607 in FIG. 6), so that $\Delta t = t_2 - t_1$. The integral of Equation 20 is computed using the angular rate $\omega_z$ recorded over past iterations of Step 813. Using Equation 9, at location (u,v) of the visual field this results in a displacement of $$\Delta v_r = -\theta_z\left(1+\frac{v^2}{f^2}\right)f = -\theta_z\left(f+\frac{v^2}{f}\right) \quad \text{(Equation 21)}$$

or $$\Delta v_r \approx -\theta_z f \quad \text{(Equation 22)}$$

if using the small field of view approximation. The value $\Delta v_r$ is the rotational component of $\Delta v$, and is the portion that can be attributed to rotation. To compute the translational velocity report, subtract out the portion of $\Delta v$ due to rotation to compute the translational distance component i.e. $\Delta v - \Delta v_r$. Then divide $\Delta v - \Delta v_r$ by the time interval $\Delta t$ to extract the translational velocity report. The translational optical flow velocity report is thus $$OF_{v_t} = \frac{\Delta v + \theta_z\left(1+\frac{v^2}{f^2}\right)f}{\Delta t\left(1+\frac{v^2}{f^2}\right)f} = \frac{\Delta v + \theta_z\left(f+\frac{v^2}{f}\right)}{\Delta t\left(f+\frac{v^2}{f}\right)} \quad \text{(Equation 23)}$$

or $$OF_{v_t} \approx \frac{\Delta v + \theta_z f}{\Delta t f} \quad \text{(Equation 24)}$$

if using the small field of view approximation.

If the velocity report were in the negative v direction, then $\Delta v$ above would be replaced with $-\Delta v$. This modification would apply for the three remaining cases below, and so would a similar modification for $\Delta u$.

Case 2, Rotation Only Around X-Axis

Consider the case of rotation along only the x-axis and measuring optical flow in the $OF_u$ direction. Suppose the feature moved along a path $\Delta u$ wide, in the u direction, with $\Delta u << f$, on the focal plane 705, and centered at (u,v). Suppose the feature took $\Delta t$ to move along this path. The uncompensated velocity report would be $$OF_u = \frac{\Delta u}{\Delta t\left(1+\frac{u^2}{f^2}\right)f} = \frac{\Delta u}{\Delta t\left(f+\frac{u^2}{f}\right)} \quad \text{(Equation 25)}$$

or $$OF_u \approx \frac{\Delta u}{\Delta t f} \quad \text{(Equation 26)}$$

using the small field approximation. Suppose that during this time, the imager rotated by $$\theta_x = \int_{t_1}^{t_2} \omega_x dt \quad \text{(Equation 27)}$$

radians about the x-axis again with $\Delta t = t_2 - t_1$. Using Equation 8, at location (u,v) of the visual field this will result in a rotational distance component of $$\Delta u_r = \theta_x\left(1+\frac{u^2}{f^2}\right)f = \theta_x\left(f+\frac{u^2}{f}\right) \quad \text{(Equation 28)}$$

or $$\Delta u_r \approx \theta_x f \quad \text{(Equation 29)}$$

using the small field approximation. The translational optical flow velocity report is similarly computed by subtracting the rotational component $\Delta u_r$ of $\Delta u$ to form the translational distance component and then dividing by the time interval $\Delta t$ to produce $$OF_{u_t} = \frac{\Delta u - \theta_x\left(1 + \frac{u^2}{f^2}\right)f}{\Delta t\left(1 + \frac{u^2}{f^2}\right)f} = \frac{\Delta u - \theta_x\left(f + \frac{u^2}{f}\right)}{\Delta t\left(f + \frac{u^2}{f}\right)} \quad \text{(Equation 30)}$$

or $$OF_{u_t} \approx \frac{\Delta u - \theta_x f}{\Delta t f} \quad \text{(Equation 31)}$$

if using the small field of view approximation.

Case 3, Rotation Only Around Y-Axis

Rotation around the y-axis affects optical flow measurements in both the u direction and the v direction. Consider these two sub-cases individually below.

Consider the case of rotation along only the y-axis and measuring optical flow along the $OF_v$ direction. Again, suppose the path traveled has a length of $\Delta v$, with $\Delta v \ll f$, was centered at (u,v), and took $\Delta t$ to move along this path. Suppose the imager rotated $\theta_y = \int_{t_1}^{t_2} \omega_y dt$ during this time period. Using Equation 9, the rotational distance component is $$\Delta v_r = -\theta_y u \quad \text{(Equation 32)}$$

Equation 32 holds regardless of whether or not the small field of view assumption is used. The translational velocity report is thus $$OF_{v_t} = \frac{\Delta v + \theta_y u}{\Delta t\left(1 + \frac{v^2}{f^2}\right)f} = \frac{\Delta v + \theta_y u}{\Delta t\left(f + \frac{v^2}{f}\right)} \quad \text{(Equation 33)}$$

or $$OF_{v_t} \approx \frac{\Delta v + \theta_y u}{\Delta t f} \quad \text{(Equation 34)}$$

when using the small field of view approximation

The case for rotation along only the y-axis and measuring optical flow along the $OF_u$ direction is handled similarly. Using Equation 8, the displacement due to rotation is $$\Delta u_r = \theta_y v \quad \text{(Equation 35)}$$

and the translational velocity report is $$OF_{u_t} = \frac{\Delta u - \theta_y v}{\Delta t\left(1 + \frac{u^2}{f^2}\right)f} = \frac{\Delta u - \theta_y v}{\Delta t\left(f + \frac{u^2}{f}\right)} \quad \text{(Equation 36)}$$

or $$OF_{u_t} \approx \frac{\Delta u - \theta_y v}{\Delta t f} \quad \text{(Equation 37)}$$

using the small field of view approximation.

Case 4, Rotation Around all Three Axes

Finally, consider the case of concurrent rotation along all three axes. Since $\Delta u, \Delta v \ll f$, subtract out the distance components due to all three rotations. The resulting translational velocity reports become $$OF_{v_t} = \frac{\Delta v + \theta_z\left(1 + \frac{v^2}{f^2}\right)f + \theta_y u}{\Delta t\left(1 + \frac{v^2}{f^2}\right)f} = \frac{\Delta v + \theta_z\left(f + \frac{v^2}{f}\right) + \theta_y u}{\Delta t\left(f + \frac{v^2}{f}\right)} \quad \text{(Equation 38)}$$

and $$OF_{u_t} = \frac{\Delta u - \theta_x\left(1 + \frac{u^2}{f^2}\right)f - \theta_y v}{\Delta t\left(1 + \frac{u^2}{f^2}\right)f} = \frac{\Delta u - \theta_x\left(f + \frac{u^2}{f}\right) - \theta_y v}{\Delta t\left(f + \frac{u^2}{f}\right)}. \quad \text{(Equation 39)}$$

If using the small field of view approximation, these values become $$OF_{v_t} \approx \frac{\Delta v + \theta_z f + \theta_y u}{\Delta t f} \quad \text{(Equation 40)}$$

and $$OF_{u_t} \approx \frac{\Delta u - \theta_x f - \theta_y v}{\Delta t f}. \quad \text{(Equation 41)}$$

To implement Step 823, the appropriate case of the above four cases is applied to each uncompensated velocity report to generate a translational velocity report. Then the resulting translational velocity reports are sent to the fusion algorithms.

Several items may be considered when implementing the above method. First, it may be advantageous to perform accurate timekeeping when computing $\Delta t$ and when recording the angular rate measurements $\omega_x$, $\omega_y$, and $\omega_z$. If the optical flow system is such that the frame rate occurs at regular intervals, perhaps with the use of a timer and an interrupt scheme or an external clock, then it is useful that the angular rate measurements are sampled as close as possible to when the image B is grabbed. This helps synchronize the measured values of $\omega_x$, $\omega_y$, and $\omega_z$ with the respective uncompensated velocity reports. Otherwise the computed values $\theta_x$, $\theta_y$, and $\theta_z$ may be based on a slightly different time interval than that of the computed rotational component, which may lead to errors.

If the optical flow system is such that new frames are grabbed whenever that portion of a program loop is reached, such as in the algorithms described in U.S. Pat. Nos. 6,020,953 and 6,384,905, then timestamps may be used to record both the start and stop times associated with a given velocity report. For example, in the context of U.S. Pat. No. 6,384,905, the increment table (defined in program line 143 of column 11 of the specification of U.S. Pat. No. 6,384,905) may specify whether to grab "start" and "stop" timestamps instead of resetting and incrementing a timer value as described in the patent. The timestamp itself may be grabbed from a timer module running on a processor or from a similar mechanism. The reason for using timestamps in this manner is that each iteration of the algorithm may undergo different program branches and therefore consume a different amount of time to execute, resulting in an irregular frame rate.

In a similar manner, the integrals used to compute $\theta_x$, $\theta_y$, and $\theta_z$ from the records of $\omega_x$, $\omega_y$, and $\omega_z$ may be computed using the same timestamps, and may be computed using a trapezoid numerical integration rule rather than a rectangular numerical integration rule.

The adherence of the above suggestions on using timestamps and methods of numerically integrating $\omega_x$, $\omega_y$, and $\omega_z$ values to estimate $\theta_x$, $\theta_y$, and $\theta_z$ values is not specifically required for the above algorithm to function properly. However these methods may increase the accuracy of the obtained measurement.

The above algorithms may be simplified if one is using a strict 1-D optical flow sensor, such as those described in U.S. Pat. Nos. 6,020,953, 6,194,695, and 6,384,905. This simplification may involve considering rotation about only one or two axes, instead of all three axes. Whether to consider rotation along one, two, or three axes would depend on the accuracy required and on the specific application.

In the event that a defined trajectory is diagonal in nature, i.e. has both $\Delta u$ and $\Delta v$ components, then the $\Delta u$ and $\Delta v$ components are each handled separately using the appropriate of the above four cases. This will generate respectively a $OF_{u_t}$ translational optical flow component and a $OF_{v_t}$ translational optical flow component. These two optical flow components are combined to form the resulting two-dimensional translational optical flow vector.

Description of the Second Exemplary Embodiment

We have given the name "software gimbaling" to the technique used in the second exemplary embodiment. In this embodiment, the image is moved against rotation-induced motion so that the only remaining changes are due to translation. In one form, software gimbaling would involve the implementation of various image transformations such as rotation, skewing, and shifting. However these functions may be too computationally intensive for implementation in a compact optical flow sensor. A simpler approach considers only pitch and raw rotations and neglects roll rotations, and assumes the field of view is sufficiently narrow that the narrow field of view approximation can be used. In this case, software gimbaling may involve just shifting the image in the horizontal or vertical direction, which is substantially less computationally intensive. For this embodiment, then, only $\omega_x$ and $\omega_z$ may be needed.

Figure 9:
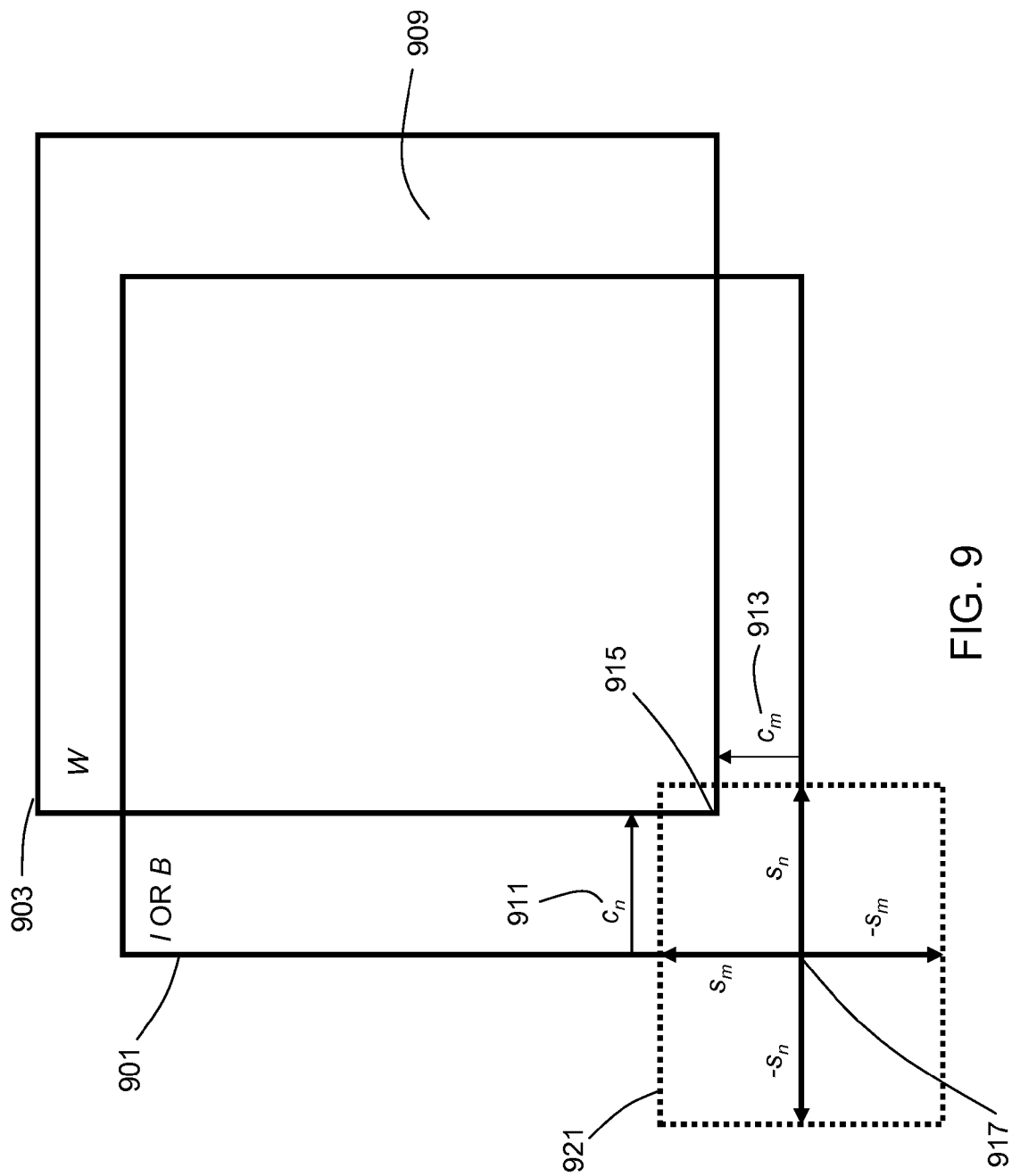
FIG. 9 shows an image and a working window used in describing the second exemplary method.

In the same manner as in the first exemplary embodiment, it is assumed that there is a gyro or some other device configured to provide angular rate measurements. Refer to FIG. 9, which shows a diagram for describing the variables used in the second exemplary embodiment.

Let the values $I_{m,n}$ and $B_{m,n}$ respectively denote the photoreceptor signal and binary feature signal located at $(u,v)=(mp, np)$ on the focal plan 705, as described above. Recall above that $I_{m,n}$ refers to the image of photoreceptor signals. Recall that $B_{m,n}$ refers to the image of binary feature signals, with $B_{m,n}$ denoting the binary feature signal corresponding to the pixel $I_{m,n}$. The box 901 depicts either the image I or B as is used below. The second exemplary embodiment is described below as using the B image, however the I image or another related image may be shifted or otherwise transformed instead.

Let W, shown in FIG. 9 as box 903, be a working array used for computing image and optical flow, with $W_{m,n}$ being an individual pixel of W, and with m and n having the same range as B. Software gimbaling may be implemented by shifting the working array W over image B by an appropriate amount to compensate for pitch and yaw rotations. For example, if a pitch rotation causes the texture inside B to shift downward by two pixels, the window W will itself move down by two pixels, so that the texture inside W appears to remain in place. The portion of B covered by W, plus blank space beyond the border of B, become the values of W. The image W may then be sent to the optical flow algorithms.

The shift may result in some pixels being dropped if W maps onto a space beyond the range of B, for example blank space 909 in FIG. 9. This is a weakness of this particular algorithm. This weakness may be mitigated by setting up an alternative method of shifting, for example where W 903 stays in place, B 901 moves against rotation, and W is adequately enlarged to accommodate all possible positions of B. This latter method does not lose pixels, but may require more computation to implement.

Let $c_m$ and $c_n$ be the "shift values", shown respectively as displacements 911 and 913 in FIG. 9. These shift values are the amount by which W is shifted when it is placed over B. These values are initialized to zero at the beginning of the program. The shift values indicated the displacement of the anchor point 915 of W 903 with respect to the anchor point 917 of image B 901.

Let $s_m$ and $s_n$ be the maximum amount by which the image W is shifted in the m and n directions when being mapped onto B. These values define a saccade box 921. If the sensor experiences enough rotation such that $|c_m|$ or $|c_n|$ exceed respectively either $s_m$ or $s_n$, or equivalently if the anchor point 915 exceeds the saccade box 921, then $c_m$ and $c_n$ are reset to zero. This is called a "saccade", which corresponds to the sensor being re-aimed after and excessive amount of rotation. When a saccade occurs, it may be necessary to reset some of the variables used to implement optical flow algorithms. Note also that the values $c_m$ and $c_n$ may be positive or negative, and may be real values to account for small rotations. When implementing shifting, one may use their respective rounded integer values $\lfloor c_m+0.5 \rfloor$ and $\lfloor c_n+0.5 \rfloor$, where $\lfloor x \rfloor$ is the most positive (or least negative) integer that is less than x. For example, 3.4 rounds to $\lfloor 3.4+0.5 \rfloor = \lfloor 3.9 \rfloor = 3$, $-0.2$ rounds to $\lfloor -0.2+0.5 \rfloor = \lfloor 0.3 \rfloor = 0$, and $-1.9$ rounds to $\lfloor -1.9+0.5 \rfloor = \lfloor -1.4 \rfloor = -2$.

Finally, let [a,b] denote the interval containing all values between a and b inclusive of a and b.

Figure 10:
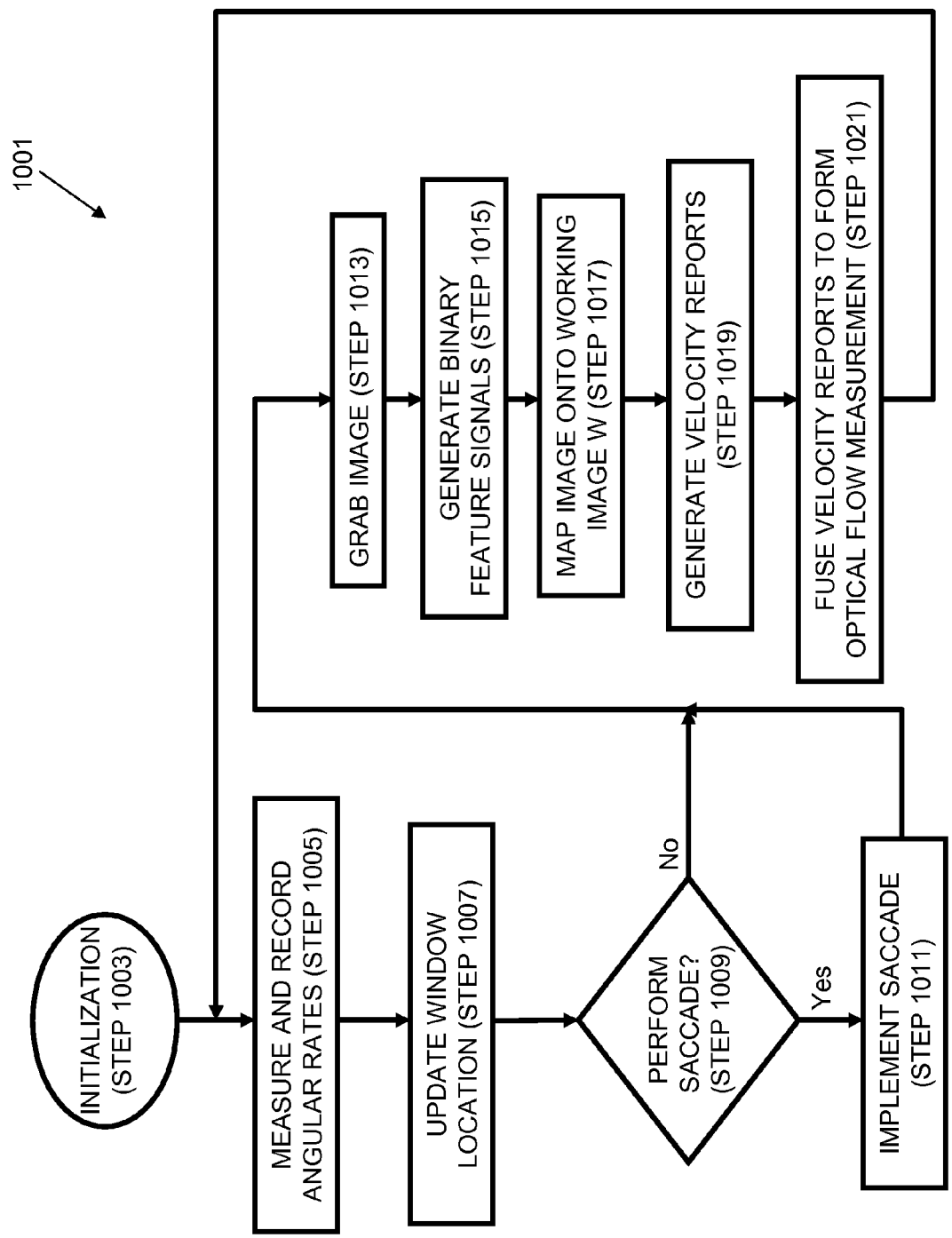
FIG. 10 shows a second exemplary method of computing optical flow.

Refer to FIG. 10, which depicts the second exemplary embodiment 1001 of the second exemplary embodiment. This embodiment comprises ten steps, which are listed next. These ten steps are one of many ways to implement software gimbaling, as described above.

Step 1003, Initialization: This step initializes the optical flow algorithms, much as is performed in Step 461 of FIG. 4B. Additionally, the shift values $c_m$ and $c_n$ are initialized to zero.

Step 1005, Measure and Record Angular Rates: In this step, the angular rates $\omega_x$ and $\omega_z$ are recorded. As mentioned above, these rates are measured by a gyro or another angular rate measuring device.

Step 1007, Update Window Location: In this step, the shift values $c_m$ and $c_n$ are updated according to the current measured angular rates. These values are computed as follows:

$$\text{Set } c_m := c_m + \omega_x \frac{f}{p} \Delta t$$

$$\text{Set } c_n := c_n - \omega_z \frac{f}{p} \Delta t$$

where $\Delta t$ is the amount of time that has elapsed since the last iteration of this step. The shift values $c_m$ and $c_n$ may also be referred to as a window location, since they mark the location of anchor point 915. Any apparatus configured for generating a window location from the angular rate measurements, whether by performing Step 1007 or otherwise, may be referred to as a window location generating apparatus.

Step 1009, Perform Saccade?: If either of the inequalities $|c_m|>s_m$ or $|c_n|>s_n$ are true, then go to Step 1011, where a saccade will be implemented. Otherwise go to Step 1013.

Step 1011, Implement Saccade. If this step is reached, then a saccade is implemented. This will prevent the anchor point 915 from exiting the saccade box 921. The saccade may be implemented as follows: First, reset any portions of the optical flow algorithms and their variables that generate velocity reports. This way no velocity reports are triggered by the saccade itself. Fusion algorithms and their variables would not be reset. Then reset both the values $c_m$ and $c_n$ back to zero. Then continue on to Step 1013. Consider how the optical flow algorithms would be reset in the context of U.S. Pat. No. 6,384,905. Lines 121 through 124 of the algorithm on column 11 of this patent would be executed for all values i from 1 through C, since these lines initialize variables used to compute velocity report. However lines 125 through 131 would not be executed, since these instructions are used to form the output of the fusion step.

Step 1013, Grab Image: This is the step in which the photoreceptor signals or image I is grabbed by an imager or vision chip in response to a visual field. This step may be performed in a manner similar to that of Step 463 of FIG. 4B. This step may be equivalently referred to as a step for generating photoreceptors from the visual field.

Step 1015, Generate Binary Feature Signals. In this step, the array B of binary feature signals are generated from the photoreceptor signals or image I. This step may be performed in a manner similar to that of Step 465 of FIG. 4B. This step may be equivalently referred to as a step for generating binary feature signals from the photoreceptor signals. Any apparatus configured for generating the binary feature signals from the image may be referred to as a feature detector array.

Note that it is possible to define a step of generating binary feature signals from the visual field, which may comprise both steps 1013 and 1015. Any apparatus configured for generating the binary feature signals from the visual field, whether by performing Steps 1013 and 1015 or otherwise, may be referred to as a binary feature signal generating apparatus.

Step 1017, Map Image B onto Working Image W. In this step, working image W 903 is created from image B. The following operations are performed:

```
For each i ∈ B_m^min...B_m^max and j ∈ B_n^min...B_n^max :
    If ⌊i + c_m + 0.5⌋ ∈ [B_m^min,B_m^max] and ⌊j + c_n + 0.5⌋ ∈ [B_n^min,B_n^max]
        Set W_{i,j} := B_{⌊i+cm+0.5⌋,⌊j+cn+0.5⌋}
    Else
        Set W_{i,j} := 0
    End If
End loop
```

The resulting working image W may also be referred to as a windowed image. Therefore Step 1017 may also be referred to as a step for generating a windowed image from the window location, which is defined by the shift values $c_m$ and $c_n$.

Note that it possible to define a step of generating a windowed image from the binary feature signals and the angular rate measurements, which may comprise Steps 1007 and 1017. Any apparatus configured for generating the windowed image from the binary feature signals and from the angular rate measurements, whether by performing Steps 1007 and 1017 or otherwise, may be referred to as a windowing device.

Step 1019, Generate Velocity Reports: The next step is to generate velocity reports from the working image W. This step may be performed in a manner similar to that of Step 467 of FIG. 4B, however the velocity reports are computed from the window W rather than from the original unshifted binary feature image B. Due to the shifting of window W, any generated velocity reports will contain only the translational optical flow components. Note that like Step 467 of FIG. 4B and Step 819 of FIG. 8, at any single iteration of Step 1019 zero, one, or multiple velocity reports may be generated, depending on what visual motion has occurred in recent time. However over multiple iterations Step 1019 multiple velocity reports will be produced over time. Therefore the plural "velocity reports" is used in the name of this step.

Step 1021, Perform Fusion: The final step is to fuse the velocity reports to produce one or more final translational optical flow measurements, which may be performed with any appropriate fusion algorithm. These measurements form the output of this algorithm. This step may be performed in a manner similar to that of Step 469 of FIG. 4B. The algorithm then loops back to Step 1005.

Note that it is possible to define a step of generating translational velocity reports from a windowed image, which may comprise steps 1019 and 1021. Any apparatus configured for generating the translational optical flow measurement from the translational velocity reports, whether by performing Steps 1019 and 1021 or otherwise, may be referred to as a motion sensing apparatus.

In the first exemplary embodiment suggestions were made regarding the use of timestamps and the methods of numerically integrating $\omega_x$, $\omega_y$, and $\omega_z$ values. These same suggestions may be applied for the second exemplary embodiment. In particular, the above algorithms may consider the fact that $\Delta t$ may not be constant for every successive frame.

Another improvement that may be made is to perform Step 1005 several times throughout the loop in method 1001, and thus obtain multiple angular rate measurements. These measurements may then be averaged together or otherwise processed to obtain a more precise window location.

The second exemplary embodiment may be simplified if only a one-dimensional optical flow sensor is being implemented. In particular, if rectangular photoreceptor arrays are used, as described in U.S. Pat. Nos. 6,020,953, 6,194,695, and 6,384,905, then it may be reasonable to shift the window W only along one axis.

Note that although the above description of the second exemplary embodiment discusses rotation in only the pitch and yaw direction, from the perspective of the sensor, this method can be extended to include roll rotation as well. In this case Step 1005 would be modified to measure rotation along all three axes, and Steps 1007, 1009, 1011, and 1017 would be modified to compute a more complex transform, which may involve shifting, stretching, shearing, and/or rotation, which together adequately account for rotation along all three axes.

Description of the Third Exemplary Embodiment

Figure 11:
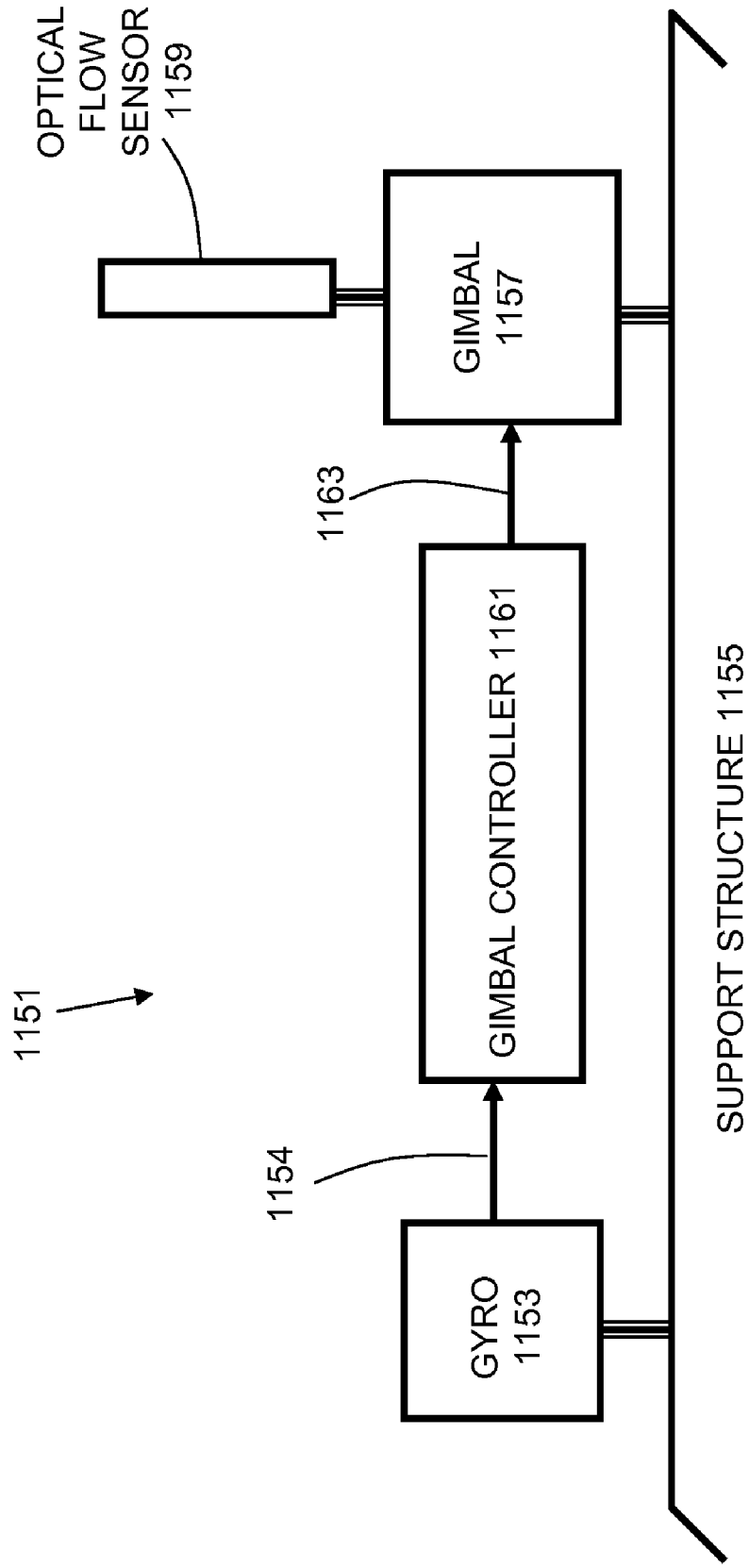
FIG. 11 shows a hardware gimbaled optical flow sensor.

We have given the name "hardware gimbaling" to the technique used in the third exemplary embodiment. The resulting apparatus is thus called a "hardware gimbaled optical flow sensor". Refer to FIG. 11, which shows a hardware gimbaled optical flow sensor 1151. A gyro 1153 is connected to a support structure 1155 and outputs angular rate measurements 1154 as experienced by the support structure 1155. The gyro 1153 may be any device that provides angular rate measurements 1154 as defined above. The support structure 1155 may be the fuselage of a UAV or the chassis of a moving vehicle or a similar mount. A gimbal 1157 is also mounted to the same support structure 1155. The gimbal 1157 is also connected to an optical flow sensor 1159 in a manner that the gimbal 1157 can control the position of the sensor 1159. The optical flow sensor 1159 may be any optical flow sensor including those from the prior art and generates optical flow measurements based on its visual field. A gimbal controller 1161 receives the angular measurements 1154 provided by the gyro 1153, and uses them to generate a gimbal control signal 1163 which is sent to the gimbal 1157. The gimbal 1157 rotates the sensor 1159 based on the gimbal control signal 1163. The gimbal controller 1161 is configured to control the gimbal 1157 in a manner that points the sensor 1159 in a constant direction even as the UAV or vehicle rotates.

Depending on the applications, the gimbal 1157 may rotate the sensor 1159 along one, two, or three axes. For example, if the sensor 1159 is a linear optical flow sensor, then it may be necessary to only measure angular rates and rotate the sensor 1159 along its axis of motion sensitivity or its sensor orientation vector. The implementation of gimbals is a well-known an established field. For easy usage on robotic platforms, one- and two-dimensional versions can be implemented using off-the-shelf servos.

The gimbal controller 1161 controls the gimbal 1157 using a program that monitors the gyro signals 1154 to arrive at an estimate of how the support structure 1155 is rotating. Then the gimbal controller 1161 directs the gimbal 1157 to in a manner that neutralizes these rotations. Depending on the nature of the robotic platform and its movements, the program may need to recenter or "saccade" the sensor to the middle if the sensor has been rotated outside of a predetermined limit.

The optical flow sensor 1159 may be constructed using any prior art optical flow sensor that may be mounted onto the gimbal 1157. For example, one possible sensor 1159 may comprise an imager, a velocity report generating apparatus, and a fusing apparatus. The imager may comprise any pixel array or photoreceptor array as described above which generates an image from a visual field, for example the photodetector array 411 of FIG. 411. The velocity report generating apparatus may comprise any apparatus as described above configured for generating velocity reports from the image, for example the combination of the feature detectors 415 and the motion detectors or equivalently the motion sensing apparatus 423 of FIG. 4A. The fusing apparatus may comprise any apparatus as described above configured for generating one or more optical flow measurements from the velocity reports, for example the fusion section 431 of FIG. 4A. In order to reduce the mass of the sensor 1159, the imager and the feature detectors may be implemented on a vision chip.

Since the optical flow sensor 1159 is prevented by this mechanism from having any angular rotation, the optical flow sensor's output will thus be a translational optical flow sensor.

Any of the above embodiments are capable of providing translational optical flow, and may be mounted on the frame of a moving vehicle, mobile robot, or a UAV. All such moving vehicles will be collectively referred to with the term "mobile robot". The mobile robot may have a gyro or an inertial measurement unit (IMU) that may provide angular rate measurements. In this case, a separate gyro is not needed for the sensor itself. It may be the case, however, that the angular rate measurement obtained by the gyro or IMU needs to be transformed to provide the roll, pitch, and yaw angular rates from the coordinate system 701 of the sensor. If multiple sensors are present, the angular rate measurements may need to be transformed individually for each sensor. The sensor may then measure translational optical flow to provide depth measurement as the mobile robot moves throughout the environment.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

U.S. Patent Documents Cited

| 6,020,953 | February 2000 | Barrows | 356/28 |
| 6,194,695 | February 2001 | Barrows | 250/208.1 |
| 6,384,905 | May 2002 | Barrows | 356/28 |
| 6,493,068 | December 2002 | Barrows | 356/28 |
| 6,683,678 | January 2004 | Barrows | 356/28 |

Other Publications Cited

J. Gibson, *The Ecological Approach to Visual Perception*, Houghton Mifflin, Boston, 1950.

C. Mead, *Analog VLSI and Neural Systems*, ISBN 0201059924, Addison wesley, 1989.

A. Moini, *Vision Chips*, ISBN 0792386647, Kluwer Academic Publishing, Norwell, Massachusetts, 1999.

K. Miller and G. Barrows, "Feature tracking linear optic flow sensor chip", 1999 *International Symposium on Circuits and Systems* (ISCAS '99), Orlando, Fla., IEEE, May 1999.

G. Barrows, K. Miller, and B. Krantz, "Fusing neuromorphic motion detector outputs for robust optical flow measurement," 1999 *International Joint Conference on Neural Networks* (IJCNN '99), Washington, D.C., IEEE, July 1999.

G. Barrows, *Mixed-Mode VLSI Optical Flow Sensors for Micro Air Vehicles*, Ph.D. Dissertation, Department of Electrical Engineering, University of Maryland at College Park, College Park, Md., December 1999.

G. Barrows and C. Neely, "Mixed-mode VLSI optical flow sensors for in-flight control of a micro air vehicle", SPIE Vol. 4109: *Critical Technologies for the Future of Computing*, July 2000.

G. Barrows, C. Neely, and K. Miller, "Optical flow sensors for UAV navigation", Chapter 26, in *Fixed and Flapping Wing Aerodynamics for Micro Air Vehicle Applications*, Volume 195, Progress in Astronautics and Aeronautics, AIAA, 2001.

G. Barrows, J. Chahl, and M. Srinivasan, "Biologically inspired visual sensing and flight control", *The Aeronautical Journal of the Royal Aeronautical Society*, 107(1069), March 2003.

We claim:

1. A method for measuring translational optical flow, comprising the steps of:

measuring an angular rate based on rotation to produce at least one angular rate measurement;

generating a plurality of uncompensated velocity reports based on a visual field;

generating a plurality of translational velocity reports based on said plurality of uncompensated velocity reports and said at least one angular rate measurement;

fusing said plurality of translational velocity reports to produce at least one translational optical flow measurement.

2. The method according to claim 1, wherein said at least one translational optical flow measurement is used in achieving depth perception.

3. The method according to claim 1, wherein said step of generating a plurality of uncompensated velocity reports comprises the steps of:

generating a plurality of binary feature signals based on said visual field; and generating said plurality of uncompensated velocity reports based on said plurality of binary feature signals.

4. The method according to claim 3, wherein said step of generating a plurality of binary feature signals is performed using a vision chip.

5. The method according to claim 3, wherein said step of generating a plurality of binary feature signals comprises the steps of:

generating a plurality of photoreceptor signals based on said visual field; and generating said plurality of binary feature signals based on said plurality of photoreceptor signals.

6. The method according to claim 5, wherein said step of generating a plurality of photoreceptor signals and said step of generating said plurality of binary feature signals are performed using a vision chip.

7. A translational optical flow sensor, comprising:

a device configured for generating at least one angular rate measurement;

an imager configured for acquiring an image based on the translational optical flow sensor's visual field;

an uncompensated velocity report generating apparatus configured for generating a plurality of uncompensated velocity reports based on said image;

a rotation compensation apparatus configured for generating a plurality of translational velocity reports based on said plurality of uncompensated velocity reports and said at least one angular rate measurement; and a fusing apparatus configured for generating at least one translational optical flow measurement based on said plurality of translational velocity reports.

8. The apparatus according to claim 7, wherein said at least one translational optical flow measurement is used in providing depth perception.

9. The apparatus according to claim 7, wherein said uncompensated velocity report generating apparatus is comprised of:

a feature detector array configured for generating a plurality of binary feature signals based on said image; and a motion sensing apparatus configured for generating said plurality of uncompensated velocity reports based on said plurality of binary feature signals.

10. The apparatus according to claim 9, wherein said imager and said feature detector array are implemented on a vision chip.

* * * * *